US012122013B2

(12) United States Patent
Yun et al.

(10) Patent No.: US 12,122,013 B2
(45) Date of Patent: Oct. 22, 2024

(54) COMPOSITION FOR POLISHING PAD AND POLISHING PAD

(71) Applicant: SK enpulse Co., Ltd., Gyeonggi-do (KR)

(72) Inventors: Jong Wook Yun, Gyeonggi-do (KR);
Jang Won Seo, Gyeonggi-do (KR);
Hyeyoung Heo, Gyeonggi-do (KR);
Eun Sun Joeng, Gyeonggi-do (KR)

(73) Assignee: SK ENPULSE CO., LTD., Gyeonggi-do (KR)

( * ) Notice: Subject to any disclaimer, the term of this patent is extended or adjusted under 35 U.S.C. 154(b) by 764 days.

(21) Appl. No.: 17/077,360

(22) Filed: Oct. 22, 2020

(65) Prior Publication Data

US 2021/0122007 A1 Apr. 29, 2021

(30) Foreign Application Priority Data

Oct. 23, 2019 (KR) ........................ 10-2019-0132512
Nov. 20, 2019 (KR) ........................ 10-2019-0149599

(51) Int. Cl.
| | |
|---|---|
| C08G 18/10 | (2006.01) |
| B24B 37/22 | (2012.01) |
| B24B 37/24 | (2012.01) |
| B24B 37/26 | (2012.01) |
| C08G 18/32 | (2006.01) |
| C08G 18/72 | (2006.01) |
| C08K 5/12 | (2006.01) |
| C08K 5/18 | (2006.01) |

(52) U.S. Cl.
CPC .............. *B24B 37/24* (2013.01); *B24B 37/22* (2013.01); *B24B 37/26* (2013.01); *C08G 18/10* (2013.01); *C08G 18/72* (2013.01); *C08G 18/3203* (2013.01); *C08K 5/12* (2013.01); *C08K 5/18* (2013.01)

(58) Field of Classification Search
CPC ................ C08G 18/10; C08G 18/3225; C08G 18/3237; C08G 18/3243; C08G 18/3203; B24B 37/24; B24B 37/26; B27B 37/22
See application file for complete search history.

(56) References Cited

U.S. PATENT DOCUMENTS

| | | | |
|---|---|---|---|
| 6,114,488 A | 9/2000 | Kulp et al. | |
| 2013/0084702 A1 | 4/2013 | Xie et al. | |

FOREIGN PATENT DOCUMENTS

| | | |
|---|---|---|
| JP | H05-125139 A | 5/1993 |
| JP | 2000-248040 A | 9/2000 |
| JP | 2011202017 A | 10/2011 |
| JP | 2013-078839 A | 5/2013 |
| JP | 2015-113369 A | 6/2015 |
| KR | 10-2003-0064782 A | 8/2003 |

(Continued)

OTHER PUBLICATIONS

JP-2015113369_Takahashi et al._Jun. 2015_English Translation.*

(Continued)

*Primary Examiner* — Michael L Leonard
(74) *Attorney, Agent, or Firm* — IP & T GROUP LLP

(57) ABSTRACT

The composition according to an embodiment employs a mixture of curing agents, which comprises a first curing agent containing sulfur and a second curing agent containing an ester group, whereby it is possible to control the physical properties of the polishing pad as necessary.

13 Claims, 5 Drawing Sheets

(56) References Cited

FOREIGN PATENT DOCUMENTS

| KR | 10-2007-0094974 A | 9/2007 | |
|---|---|---|---|
| KR | 10-2008-0072896 A | 8/2008 | |
| KR | 10-2012-0030457 A | 3/2012 | |
| KR | 10-2030865 B1 | 10/2019 | |
| TW | 201122033 A1 | 7/2011 | |
| WO | WO-2011016971 A1 * | 2/2011 | ............. B24B 37/24 |

OTHER PUBLICATIONS

Office Action issued by the Taiwanese Patent Office on Jun. 17, 2021.
Office Action issued by the Korean Patent Office on Feb. 10, 2021.
Office Action issued by the Japanese Patent Office on Dec. 7, 2021.
Office Action issued by the Korean Patent Office on Dec. 16, 2020.
Office Action for Japanese Patent Application No. 2020-178447 issued by the Japanese Patent Office on Jul. 26, 2022.
Office Action on the Japanese Patent Application No. 2023-047202 issued by the Japanese Patent Office on Mar. 12, 2024.

* cited by examiner

[Fig. 1]
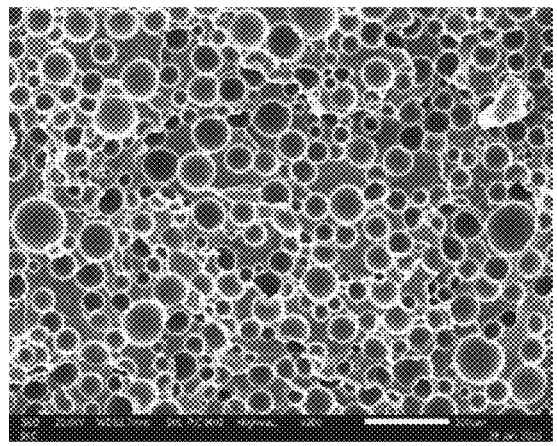
[Fig. 2]
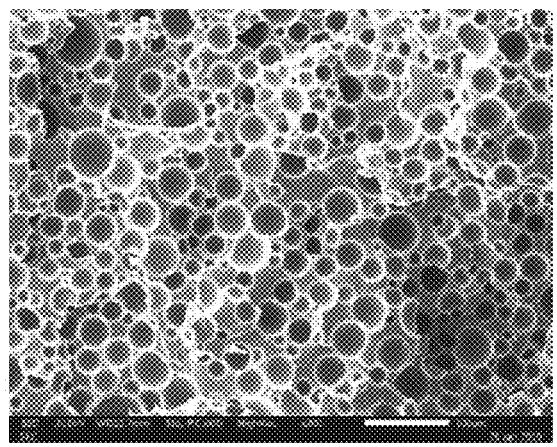

[Fig. 3]
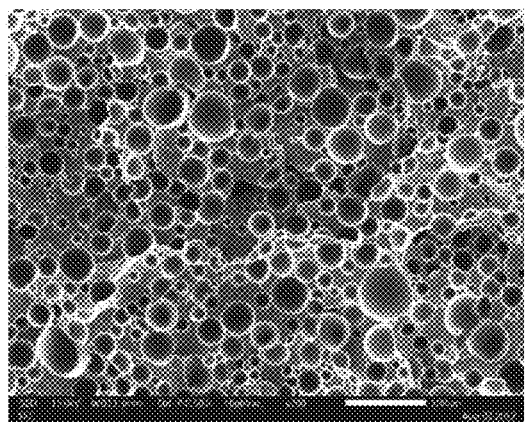
[Fig. 4]
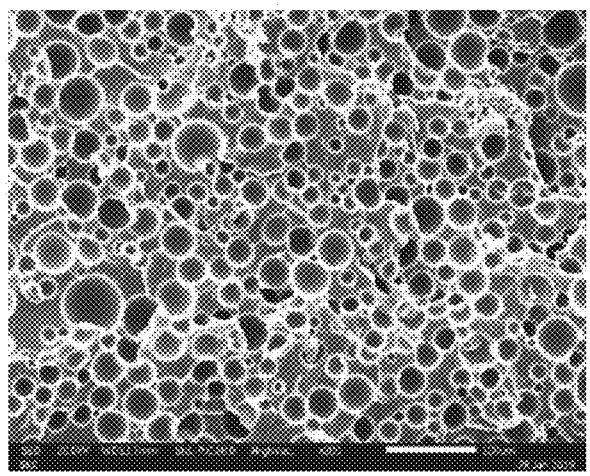

[Fig. 5]
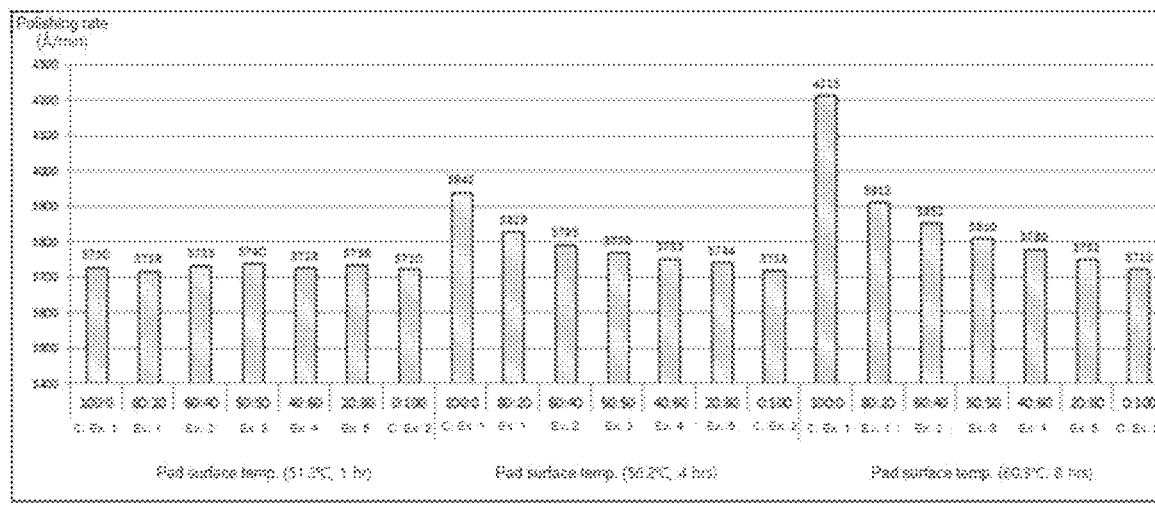
[Fig. 6]
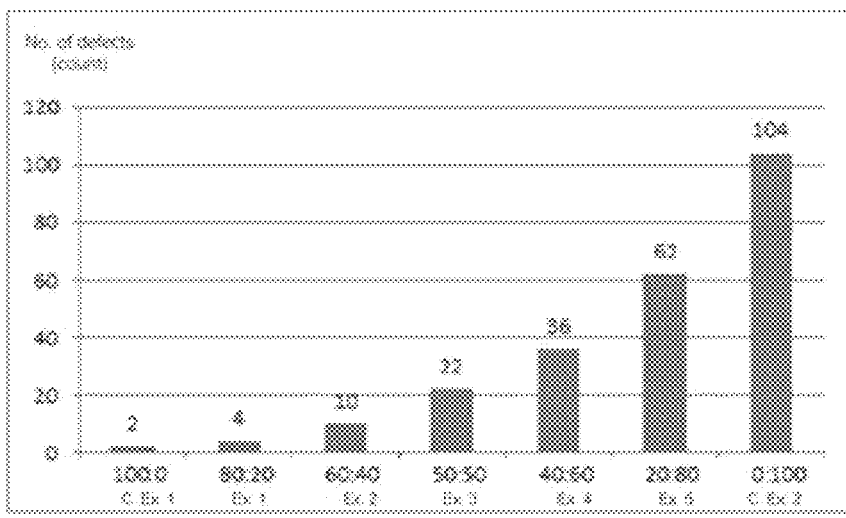

[Fig. 7]
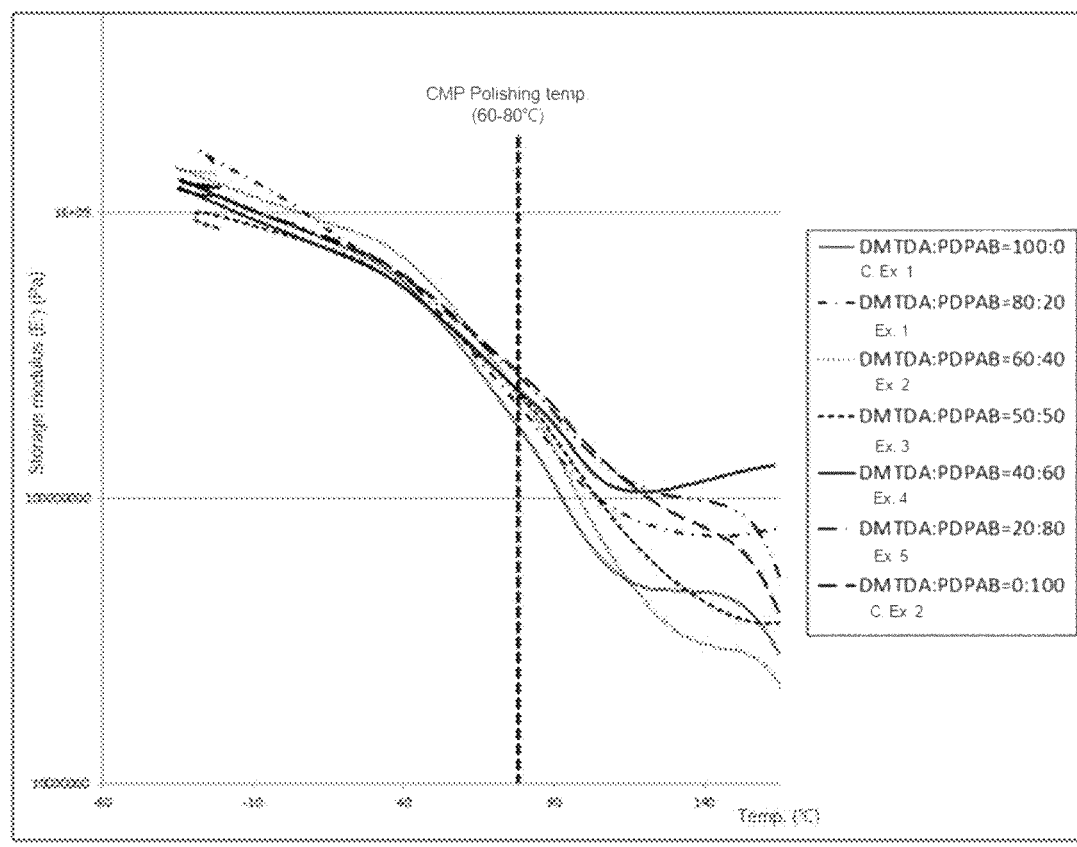

[Fig. 8]
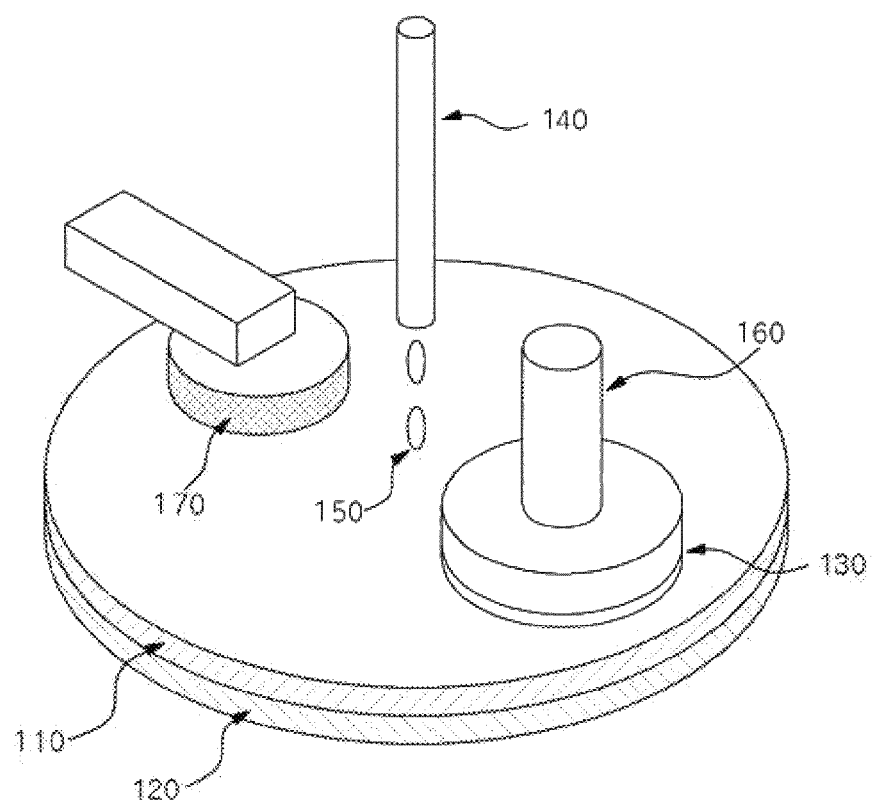

COMPOSITION FOR POLISHING PAD AND POLISHING PAD

The present application claims priority of Korean patent application numbers 10-2019-0132512 filed on Oct. 23, 2019 and Korean patent application numbers 10-2019-0149599 filed on Nov. 20, 2019. The disclosure of each of the foregoing applications is incorporated herein by reference in its entirety.

TECHNICAL FIELD

Embodiments relate to a composition for a polishing pad to be used in a chemical mechanical planarization (CMP) process of semiconductors, a polishing pad, a process for preparing the same, and a process for preparing a semiconductor device using the same.

BACKGROUND ART

The Chemical mechanical planarization (CMP) process in a process for preparing semiconductors refers to a step in which a semiconductor substrate such as a wafer is fixed to a head and in contact with the surface of a polishing pad mounted on a platen, and the wafer is then chemically treated by supplying a slurry while the platen and the head are relatively moved, to thereby mechanically planarize the irregularities on the semiconductor substrate.

A polishing pad is an essential member that plays an important role in such a CMP process. In general, a polishing pad comprises a polishing layer composed of a polyurethane-based resin and a support layer, and the polishing layer has, on its surface, grooves for a large flow of a slurry and pores for supporting a fine flow thereof. The pores in a polishing layer may be formed by using a solid phase foaming agent having a fine hollow structure, a liquid phase foaming agent using a volatile liquid, a gas phase foaming agent such as an inert gas, or the like, or by generating a gas by a chemical reaction.

Since the polishing layer comprising pores directly interacts with the surface of a semiconductor substrate during the CMP process, it affects the processing quality of the surface of the semiconductor substrate.

In particular, the polishing rate and the occurrence of defects such as scratches during the CMP process may sensitively vary with the components, physical properties, and pore shape of the polishing layer. In addition, a high-hardness additive in the raw materials constituting the polishing layer may cause scratches and surface defects on the semiconductor substrate during the CMP process. In particular, such surface defects may decrease the polishing rate during the CMP process carried out at a high temperature of 50° C. or higher, which may deteriorate the quality of the semiconductor substrate. Thus, there has been a continuing demand for research on the enhancement of the polishing rate by minimizing scratches and surface defects occurring on the semiconductor substrate during the CMP process.

Further, a deterioration in the thermal stability of the polishing pad may decrease the polishing rate during the CMP process carried out at a high temperature of 50° C. or higher, which may deteriorate the quality of the semiconductor substrate. Further, the polishing rate is decreased when polishing is carried out for a long period of time at a high temperature. Accordingly, various studies have been conducted to solve the above problems to enhance the polishing stability. For example, various methods are known for enhancing the polishing rate and polishing stability by using 4,4'-methylenebis(2-chloroaniline) (MOCA) as a curing agent. However, although the physical properties and polishing properties can be enhanced to some extent if MOCA is used as a curing agent, higher thermal stability is required in the CMP process carried out for a long period of time. Since it contains harmful substances, it adversely affects the human body and the environment. Thus, there is an urgent need for research on a composition for a polishing pad and a polishing pad that has excellent thermal stability even at high temperatures of 50° C. or higher with a reduced amount of MOCA or a curing agent that substitutes therefor and minimizes the rate of change in the polishing rate even after a long period of operation, thereby enhancing the polishing stability.

DETAILED DESCRIPTION OF THE INVENTION

Technical Problem

The present invention aims to solve the above problems of the prior art.

The technical problem to be solved by the present invention is to provide a composition that uses a mixture of curing agents to secure excellent elongation and hardness and improves scratches and surface defects occurring on the surface of a semiconductor substrate, thereby further enhancing the polishing rate, a polishing pad using the same, and a process for preparing the same.

In addition, the technical problem to be solved by the present invention is to provide an environmentally friendly composition for a polishing pad that uses a mixture of curing agents, without 4,4'-methylenebis(2-chloroaniline) (MOCA), which can enhance the physical properties such as tensile strength, hardness, and modulus and the polishing rate, is excellent in thermal stability by virtue of a low rate of reduction in the storage modulus even at high temperatures, and can further enhance the polishing stability, a polishing pad using the same, and a process for preparing a semiconductor device using the polishing pad.

Solution to the Problem

In order to achieve the above object, an embodiment provides a composition, which comprises a urethane-based prepolymer and a mixture of curing agents, wherein the mixture of curing agents comprises a first curing agent containing sulfur and a second curing agent containing an ester group.

Another embodiment provides a composition, which comprises a urethane-based prepolymer and a mixture of curing agents, wherein the mixture of curing agents comprises a first curing agent containing sulfur and a second curing agent containing an ester group, and the first curing agent is employed more than the second curing agent.

Still another embodiment provides a composition, which comprises a urethane-based prepolymer and a mixture of curing agents, wherein the mixture of curing agents comprises a first curing agent containing sulfur and a second curing agent containing an ester group, the first curing agent is a liquid curing agent containing sulfur, the second curing agent is a solid curing agent containing an ester group and two or more benzene rings, and the content of the solid curing agent is equal to, or greater than, the content of the liquid curing agent based on the weight.

Still another embodiment provides a process for preparing a polishing pad, which comprises preparing a first raw material composition comprising a urethane-based prepolymer; preparing a second raw material composition comprising a first curing agent containing sulfur and a second curing agent containing an ester group; preparing a third raw material composition comprising a foaming agent; sequentially or simultaneously mixing the first raw material composition with the second raw material composition and the third raw material composition to prepare a raw material mixture; and injecting the raw material mixture into a mold and curing it.

Still another embodiment provides a polishing layer, which comprises a polishing layer comprising a urethane-based prepolymer and a mixture of curing agents, wherein the mixture of curing agents comprises a first curing agent containing sulfur and a second curing agent containing an ester group.

Still another embodiment provides a process for preparing a semiconductor device, which comprises providing a polishing pad; disposing an object to be polished on the polishing pad; and rotating the object to be polished relative to the polishing pad to polish the object to be polished, wherein the polishing pad comprises a urethane-based prepolymer and a mixture of curing agents, and the mixture of curing agents comprises a first curing agent containing sulfur and a second curing agent containing an ester group.

Advantageous Effects of the Invention

The composition according to an embodiment employs a mixture of curing agents, which comprises a first curing agent containing sulfur and a second curing agent containing an ester group, whereby it is possible to control the physical properties of the polishing pad as necessary. Specifically, the content of the first curing agent is greater than the content of the second curing agent in the mixture of curing agents, whereby it is possible for the polishing pad thus prepared to minimize the occurrence of defects such as scratches on the surface of a semiconductor substrate during the CMP process and to provide a high polishing rate. In addition, the content of the second curing agent is equal to, or greater than, the content of the first curing agent in the mixture of curing agents, whereby it is possible to secure an appropriate level of physical properties such as tensile strength and modulus, without the use of 4,4'-methylenebis(2-chloroaniline) (MOCA), as well as to minimize the rate of reduction in the storage modulus with respect to a temperature change at high temperatures, resulting in excellent thermal stability and further enhancements in the polishing stability.

BRIEF DESCRIPTION OF THE DRAWINGS

FIGS. 1 to 4 are scanning electron microscope (SEM) images of a cross-section of the polishing pads prepared in Examples 1, 3, and 5 and Comparative Example 2.

FIG. 5 shows the polishing stability with respect to a temperature change of the polishing pads prepared in Examples 1 to 5 and Comparative Examples 1 and 2, FIG. 6 shows the number of defects occurring on the surface of a semiconductor substrate (wafer) upon polishing thereof using the polishing pads prepared in Examples 1 to 5 and Comparative Examples 1 and 2.

FIG. 7 shows the storage modulus with respect to a temperature change of the polishing pads prepared in Examples 1 to 5 and Comparative Examples 1 and 2.

FIG. 8 schematically illustrates the process for preparing a semiconductor device according to an embodiment.

BEST MODE FOR CARRYING OUT THE INVENTION

In the description of the following embodiments, in the case where each layer or pad is mentioned to be formed "on" or "under" another layer or pad, it means not only that one element is "directly" formed on or under another element, but also that one element is "indirectly" formed on or under another element with other element(s) interposed between them.

In addition, the term on or under with respect to each element may be referenced to the drawings. For the sake of description, the sizes of individual elements in the appended drawings may be exaggeratedly depicted and do not indicate the actual sizes.

In addition, all numerical ranges related to the physical properties, dimensions, and the like of a component used herein are to be understood as being modified by the term "about," unless otherwise indicated.

In the present specification, the term "heteroalkyl," by itself or in combination with another term, unless otherwise stated, refers to a stable straight or branched chain hydrocarbon radical composed of the specified number of carbon atoms and 1 to 3 heteroatoms selected from the group consisting of N, O, Si, and S. Here, the nitrogen and sulfur atoms may be optionally oxidized, and the nitrogen heteroatom may be optionally quaternized. Heteroatoms N, O and S may be located at any internal position of the heteroalkyl group.

The term "heterocycloalkyl" refers to a saturated or partially unsaturated ring radical having a total number of ring atoms of 3 to 10 and containing 1 to 5 heteroatoms selected from N, O, and S. Here, the nitrogen and sulfur atoms as ring atoms may be optionally oxidized, and the nitrogen atom as a ring atom may be optionally quaternized. Unless otherwise stated, "heterocycloalkyl" may be a monocyclic, bicyclic, spirocyclic, or polycyclic ring, "Heterocycloalkyl" may be attached to the remainder of the molecule through one or more ring carbons or heteroatoms.

The term "alkylene," by itself or as part of another substituent, refers to a divalent radical derived from an alkane, as exemplified by —$CH_2CH_2CH_2CH_2$—.

The term "heteroalkylene," by itself or as part of another substituent, refers to a saturated, unsaturated, or polyunsaturated divalent radical derived from heteroalkyl, as exemplified by —$CH_2$—$CH_2$—S—$CH_2$—$CH_2$—, —$CH_2$—S—$CH_2$—$CH_2$—NH—$CH_2$—, —O—$CH_2$—CH=CH—, —$CH_2$—CH=C(H)$CH_2$—O—$CH_2$—, and —S—$CH_2$—C≡C—. In heteroalkylene groups, the heteroatom may also occupy one or both of the chain ends (e.g., alkyleneoxy, alkylenedioxy, alkyleneamino, alkylenediamino, and the like). The term "heteroalkylene" may also encompass monohalogenated and polyhalogenated variants.

The term "aryl," unless otherwise stated, typically refers to a polyunsaturated aromatic hydrocarbon ring, which may be a single ring or multiple rings fused together (up to three rings). The term "heteroaryl" refers to an aryl ring containing 1 to 5 heteroatoms selected from N, O, and S. Here, the nitrogen and sulfur atoms may be optionally oxidized, and the nitrogen atom may be optionally quaternized. Heteroaryl may be attached to the remainder of the molecule through heteroatoms. Non-limiting examples of aryl groups include phenyl, naphthyl, and biphenyl. Non-limiting examples of heteroaryl groups include pyridyl, pyridazinyl, pyrazinyl, pyrimidinyl, triazinyl, quinolinyl, quinoxalinyl, quinazolinyl, cinnolinyl, phthalazinyl, benzotriazinyl, purinyl, benzimidazolyl, benzopyrazolyl, benzotriazolyl, benzisoxazolyl, isobenzofuryl, isoindolyl, indolizinyl, benzotriazinyl, thienopyridinyl, thienopyrimidinyl, pyrazolopyrimidinyl, imidazopyridinyl, benzothiazolyl, benzofuranyl, benzothienyl, indolyl, quinolyl, isoquinolyl, isothiazolyl, pyrazolyl, indazolyl, pteridinyl, imidazolyl, triazolyl, tetrazolyl, oxazolyl, isoxazolyl, thiadiazolyl, pyrrolyl, thiazolyl, furyl, thienyl, and the like.

[Composition]

An embodiment of the present invention provides a composition, which comprises a urethane-based prepolymer and a mixture of curing agents, wherein the mixture of curing agents comprises a first curing agent containing sulfur and a second curing agent containing an ester group.

In the Case where the First Curing Agent is Employed More than the Second Curing Agent Specifically, an embodiment provides a composition, which comprises a urethane-based prepolymer and a mixture of curing agents, wherein the mixture of curing agents comprises a first curing agent containing sulfur and a second curing agent containing an ester group, and the first curing agent is employed more than the second curing agent.

According to an embodiment, a mixture of curing agents, which comprises the first curing agent containing sulfur and the second curing agent containing an ester group, is used, whereby it is possible to enhance the polishing rate and the physical properties. In particular, the content of the first curing agent is greater than the content of the second curing agent in the mixture of curing agents, whereby it is possible to minimize the occurrence of defects such as scratches on the surface of a semiconductor substrate during the CMP process and to further enhance the polishing rate.

The first curing agent may comprise at least one selected from the group consisting of 3,5-dimethylthio-2,6-diaminotoluene, 2,6-bis(methylthio)-4-methyl-1,3-benzenediamine, molybdenum sulfide, niobium sulfide, talc (hydrated magnesium silicate), tantalum sulfide, and tungsten disulfide.

According to an embodiment of the present invention, a sulfur-containing compound is employed in the polishing pad, which may modify the physical properties such as elongation and hardness of the polishing pad. In particular, it is possible to enhance the thermal characteristics, as well as to improve scratches and surface defects occurring on the surface of a semiconductor substrate.

The content of the first curing agent may be 11 parts by weight to 18 parts by weight, 11 parts by weight to 17 parts by weight, 12 parts by weight to 16 parts by weight, 11 parts by weight to 14 parts by weight, or 14 parts by weight to 18 parts by weight, based on 100 parts by weight of the composition. If the content of the first curing agent exceeds the above range, the thermal characteristics at high temperatures may be deteriorated or the hardness may be too weak, so that there may arise a problem in the CMP process. If the content of the first curing agent is less than the above range, the elongation may be decreased, scratches and surface defects occurring on the surface of a semiconductor substrate may be increased, and the polishing rate may be decreased.

The second curing agent may comprise at least one selected from the group consisting of compounds represented by the following Formulae 1 to 3.

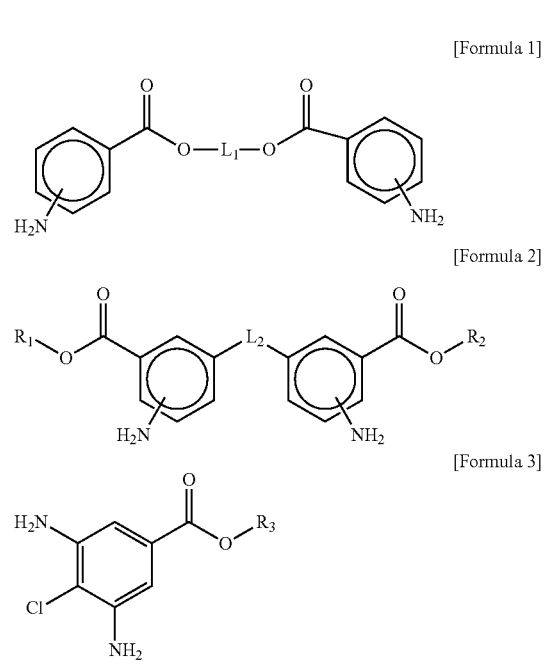

[Formula 1]

[Formula 2]

[Formula 3]

In Formula 1, $L_1$ is at least one selected from a linear or branched alkylene group having 1 to 20 carbon atoms, a linear or branched heteroalkylene group having 1 to 20 carbon atoms, a substituted or unsubstituted cycloalkylene group having 5 to 30 carbon atoms, a substituted or unsubstituted heterocycloalkylene group having 5 to 30 carbon atoms, a substituted or unsubstituted arylene group having 5 to 30 carbon atoms, and a substituted or unsubstituted heteroarylene group having 5 to 30 carbon atoms.

In Formula 2, $L_2$ is at least one selected from a linear or branched alkylene group having 1 to 20 carbon atoms, a linear or branched heteroalkylene group having 1 to 20 carbon atoms, a substituted or unsubstituted cycloalkylene group having 5 to 30 carbon atoms, a substituted or unsubstituted heterocycloalkylene group having 5 to 30 carbon atoms, a substituted or unsubstituted arylene group having 5 to 30 carbon atoms, and a substituted or unsubstituted heteroarylene group having 5 to 30 carbon atoms.

$R_1$ and $R_2$ are each independently at least one selected from a linear or branched alkyl group having 1 to 20 carbon atoms, a linear or branched heteroalkyl group having 1 to 20 carbon atoms, a substituted or unsubstituted cycloalkyl group having 5 to 30 carbon atoms, a substituted or unsubstituted heterocycloalkyl group having 5 to 30 carbon atoms, a substituted or unsubstituted aryl group having 5 to 30 carbon atoms, and a substituted or unsubstituted heteroaryl group having 5 to 30 carbon atoms.

In Formula 3, $R_3$ is at least one selected from a linear or branched alkyl group having 1 to 20 carbon atoms, a linear or branched heteroalkyl group having 1 to 20 carbon atoms, a substituted or unsubstituted cycloalkyl group having 5 to 30 carbon atoms, a substituted or unsubstituted heterocycloalkyl group having 5 to 30 carbon atoms, a substituted or unsubstituted aryl group having 5 to 30 carbon atoms, and a substituted or unsubstituted heteroaryl group having 5 to 30 carbon atoms.

The second curing agent may comprise at least one selected from the group consisting of 1,3-propanediol bis (4-aminobenzoate) (PDPAB), 4-(4-aminobenzoyl)oxyphenyl 4-aminobenzoate, 4-(4-aminobenzoyl)oxybutyl 4-aminobenzoate, 4-[4-(4-aminobenzoyl)oxy-3-methylbutoxy] butyl 4-aminobenzoate, methylene bis-methylanthranilate (MBNA), and isobutyl 3,5-diamino-4-chlorobenzoate (BDACB). Specifically, it may comprise 1,3-propanediol bis(4-aminobenzoate) (PDPAB).

As the second curing agent contains an ester group, it is possible to enhance the hardness, tensile strength, and modulus at high temperatures, to enhance the thermal characteristics, and to improve the wear characteristics of the CMP pad.

The content of the second curing agent may be 1 part by weight to 10 parts by weight, 2 parts by weight to 10 parts by weight, 3 parts by weight to 8 parts by weight, 2 parts by weight to 5 parts by weight, or 5 parts by weight to 10 parts by weight, based on 100 parts by weight of the composition. If the content of the second curing agent exceeds the above range, the elongation may be increased, scratches and surface defects occurring on the surface of a semiconductor substrate may be increased, and the polishing rate may be decreased. If the content of the second curing agent is less than the above range, the thermal characteristics at high temperatures may be deteriorated or the hardness may be too weak, so that there may arise a problem in the CMP process.

As described above, as the first and second curing agents are used together, it is possible to secure excellent hardness and elongation even at high temperatures and to enhance the polishing characteristics. In addition, when the content of the first curing agent is greater than the content of the second curing agent in the mixture of curing agents, it is possible to improve the occurrence of scratches and surface defects appearing on the surface of a semiconductor substrate by appropriately adjusting the hardness and to further enhance the polishing rate.

The content ratio of the first curing agent and the second curing agent may be 1:0.1 to 0.9, 1:0.1 to 0.5, 1:0.1 to 0.4, or 1:0.5 to 0.9, as a weight ratio. If the content of the first curing agent is excessive, thereby exceeding the above range, the thermal characteristics at high temperatures may be deteriorated or the hardness may be too weak, so that there may arise a problem in the CMP process. If the content of the first curing agent is too small, thereby being less than the above range, the elongation may be too increased, scratches and surface defects occurring on the surface of a semiconductor substrate may be remarkably increased, and the polishing rate may be decreased.

In the Case where the Second Curing Agent is Employed Equal to, or Greater than, the First Curing, Agent Another embodiment provides a composition, which comprises a urethane-based prepolymer and a mixture of curing agents, wherein the mixture of curing agents comprises a first curing agent containing sulfur and a second curing agent containing an ester group, the first curing agent is a liquid curing agent containing sulfur, the second curing agent is a solid curing agent containing an ester group and two or more benzene rings, and the content of the solid curing agent is equal to, or greater than, the content of the liquid curing agent based on the weight.

According to an embodiment of the present invention, a mixture of curing agents, which comprises the liquid curing agent containing sulfur and the solid curing agent containing an ester group and two or more benzene rings, is used, whereby it is possible to enhance the thermal characteristics at high temperatures (50° C. to 100° C.), in particular, the content of the solid curing agent (i.e., the second curing agent) is equal to, or greater than, the content of the liquid curing agent (i.e., the first curing agent) in the mixture of curing agents, whereby it is possible to minimize the rate of reduction in the storage modulus with respect to a temperature change, thereby further enhancing the thermal stability and polishing stability.

The liquid curing agent is a compound containing sulfur and may contain two or more sulfur elements in the molecule. Specifically, it may contain two sulfur elements in the molecule.

In addition, the liquid curing agent may contain an active hydrogen group. The liquid curing agent may contain at least one selected from the group consisting of an amine group (—$NH_2$), a hydroxyl group (—OH), a carboxylic acid group (—COOH), an epoxy group, and a combination thereof as an active hydrogen group. Specifically, it may contain an amine group (—$NH_2$).

The liquid curing agent may have a weight average molecular weight of 50 g/mole to 300 g/mole, for example, 100 g/mole to 250 g/mole, for example, 150 g/mole to 250 g/mole, for example, 200 g/mole to 250 g/mole.

In addition, the liquid curing agent may be liquid at room temperature. Alternatively, the liquid curing agent may have a boiling point (b.p.) of 160° C. to 240° C., specifically 170° C. to 240° C., more specifically 170° C. to 220° C.

The liquid curing agent may comprise at least one selected from the group consisting of 3,5-dimethylthio-2,6-diaminotoluene and 2,6-bis(methylthio)-4-methyl-1,3-benzenediamine.

According to an embodiment, a sulfur-containing compound is employed in the polishing pad, which may modify the physical properties such as elongation and hardness of the polishing pad, resulting in improvements in the polishing rate and cut pad rate. In particular, it is possible to enhance the thermal characteristics, as well as to improve scratches and surface defects occurring on the surface of a semiconductor substrate. Further, since excellent physical properties are achieved without the use of MOCA containing harmful substances, environmentally friendly and excellent polishing pads can be prepared.

The content of the liquid curing agent may be 5 parts by weight to 30 parts by weight, for example, 10 parts by weight to 30 parts by weight, for example, 15 parts by weight to 25 parts by weight, for example, 18 parts by weight to 23 parts by weight, based on 100 parts by weight of the composition. If the content of the liquid curing agent satisfies the above range, it is possible to achieve appropriate tensile strength and modulus and to minimize the rate of reduction in the storage modulus with respect to a temperature change, thereby enhancing the polishing stability.

The solid curing agent may be a solid curing agent containing an ester group and two or more benzene rings. Specifically, the solid curing agent may contain two or more ester groups having a benzene ring in the molecule. Specifically, it may contain two ester groups having a benzene ring in the molecule. If the solid curing agent has two or more benzene rings, the molecular structure is harder than the case where the solid curing agent has one benzene ring, so that it can impart overall rigidity to the cured product, which enhances the thermal resistance characteristics and hardness.

In addition, the solid curing agent may contain an active hydrogen group. The solid curing agent may contain an amine group (—$NH_2$) as an active hydrogen group.

The solid curing agent may have a weight average molecular weight of 150 g/mole to 400 g/mole, for example, 150 g/mole to 350 g/mole, for example, 200 g/mole to 350 g/mole, for example, 250 g/mole to 350 g/mole, for example, 300 g/mole to 350 g/mole. The solid curing agent may have a melting point (m.p.) of 100° C. to 150° C., for example, 100° C. to 140° C., for example, 110° C. to 130° C.

The solid curing agent may comprise at least one selected from the group consisting of compounds represented by the following Formulae 1 and 2.

[Formula 1]

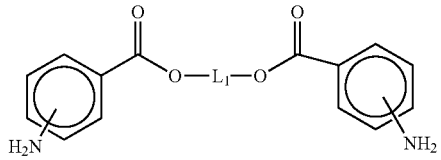

[Formula 2]

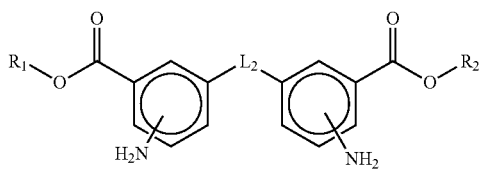

$L_1$, $L_2$, $R_1$, and $R_2$ are as described above.

Specifically, the solid curing agent may comprise at least one selected from the group consisting of 1,3-propanediol bis(4-aminobenzoate) (PDPAB), 4-(4-aminobenzoyl)oxyphenyl 4-aminobenzoate, 4-(4-aminobenzoyl)oxybutyl 4-aminobenzoate, 4-[4-(4-aminobenzoyl)oxy-3-methylbutoxy]butyl 4-aminobenzoate, and methylene bis-methylanthranilate (MBNA). Specifically, it may comprise 1,3-propanediol bis(4-aminobenzoate) (PDPAB).

The solid curing agent contains an ester group and two or more benzene rings, so that it has excellent tensile strength, modulus, and hardness at high temperatures. In particular, as the temperature rises to a high temperature of 50° C. to 100° C., particularly 50° C. to 70° C., or as time passes, the rate of change in the polishing rate is low, and the rate of reduction in the storage modulus is low as well, so that polishing stability can be further improved. In addition, unlike 4,4'-methylenebis(2-chloroaniline) (MOCA) containing a halogen group, for example, chlorine (Cl), in one benzene ring, the solid curing agent may be relatively desirable from the viewpoint of environmental friendliness since it does not contain a halogen group.

The content of the solid curing agent may be 8.5 parts by weight to 35 parts by weight, for example, 10 parts by weight to 30 parts by weight, for example, 15 parts by weight to 30 parts by weight, for example, 18 parts by weight to 28 parts by weight, for example, 18 parts by weight to 25 parts by weight, based on 100 parts by weight of the composition. If the content of the solid curing agent satisfies the above range, it is possible to achieve appropriate tensile strength and modulus and to minimize the rate of reduction in the storage modulus with respect to a temperature change at high temperatures, thereby enhancing the thermal stability and polishing stability.

As described above, as the liquid and solid curing agents are used together, it is possible to achieve excellent physical properties and polishing characteristics even at high temperatures in an environmentally friendly manner without the use of 4,4-methylene-bis-(2-chloroaniline) (MOCA). In addition, if the content of the solid curing agent is equal to, or greater than, the content of the liquid curing agent in the mixture of curing agents, the rate of change in the polishing rate due to polishing at high temperatures and for a long period of time may be low, and the thermal stability may be enhanced. To this end, however, the content ratio of the solid curing agent and the liquid curing agent may be important.

The content ratio of the solid curing agent and the liquid curing agent may be 1:0.1 to 1, 1:0.2 to 1, 1:0.2 to 0.8, 1:0.2 to 0.7, 1:0.1 to 0.5, 1:0.1 to 0.4, or 1:0.1 to 0.25, as a weight ratio. If the content of the liquid curing agent is excessively large or the content of the solid curing agent is excessively small, thereby falling outside the above range, the storage modulus may be decreased too much as the temperature increases, so that the thermal characteristics may be deteriorated to adversely affect the polishing stability. If the content of the liquid curing agent is excessively small or the content of the solid curing agent is excessively large, thereby falling outside the above range, the modulus may be excessively increased and the elongation may be excessively decreased.

Meanwhile, the composition according to an embodiment comprises a urethane-based prepolymer.

A prepolymer generally refers to a polymer having a relatively low molecular weight wherein the degree of polymerization is adjusted to an intermediate level so as to conveniently mold a molded article to be finally produced in the process of preparing the same. A prepolymer may be molded by itself or after a reaction with another polymerizable compound. Specifically, the urethane-based prepolymer comprises a prepolymerization reaction product of at least one diisocyanate monomer and at least one polyol.

The at least one diisocyanate monomer may be at least one aromatic diisocyanate monomer and/or at least one aliphatic or alicyclic diisocyanate monomer. For example, it may be at least one isocyanate selected from the group consisting of toluene diisocyanate (TDI), naphthalene-1,5-diisocyanate, p-phenylene diisocyanate, tolidine diisocyanate, diphenylmethane diisocyanate (MDI), hexamethylene diisocyanate (HDI), dicyclohexylmethane diisocyanate (H12MDI), and isophorone diisocyanate.

The polyol refers to a compound that comprises two or more hydroxyl groups. It may comprise a single-molecule-type polyol and a polymer-type polyol.

The single-molecule-type polyol may be at least one selected from the group consisting of ethylene glycol (EG), diethylene glycol (DEG), propylene glycol (PG), propanediol (PDO), and methyl propanediol (MP-diol). The polymer-type polyol may be at least one selected from the group consisting of a polytetramethylene ether glycol (PTMEG), a polyether polyol, a polyester polyol, a polycarbonate polyol, and a polycaprolactone polyol. The polymer-type polyol may have a weight average molecular weight of 300 g/mole to 3,000 g/mole.

The urethane-based prepolymer has an isocyanate end group content (NCO %) of 6% by weight to 12% by weight, 6% by weight to 11% by weight, 6% by weight to 10% by weight, 8% by weight to 10% by weight, or 8% by weight to 9% by weight.

In addition, in the urethane-based prepolymer and the mixture of curing agents, the equivalent ratio of the reactive groups in the respective molecules, for example, the isocyanate end group in the urethane-based prepolymer and the $NH_2$ group in the first curing agent and the second curing agent of the mixture of curing agents may be 1:0.7 to 1, specifically 1:0.75 to 1. If the equivalent ratio of the isocyanate end group in the urethane-based prepolymer and the $NH_2$ group in the mixture of curing agents falls outside the above range, there may be a problem in controlling the hardness intended in the present invention, so that the physical properties including the polishing rate of the polishing pad may be deteriorated.

In addition, the mixture of curing agents may further comprise other commonly used curing agents in addition to the first curing agent and the second curing agent. The additional curing agent may be, for example, at least one of an amine compound and an alcohol compound. Specifically, the additional curing agent may comprise at least one compound selected from the group consisting of an aromatic amine, an aliphatic amine, an aromatic alcohol, and an aliphatic alcohol.

For example, the additional curing agent may be at least one selected from the group consisting of diethyltoluenediamine (DETDA), diaminodiphenylmethane, diaminodiphenyl sulphone, m-xylylene diamine, isophoronediamine, ethylenediamine, diethylenetriamine, triethylenetetramine, polypropylenediamine, polypropylenetriamine, ethylene glycol, diethylene glycol, dipropylene glycol, butanediol, hexanediol, glycerin, trimethylolpropane, and bis(4-amino-3-chlorophenyl)methane.

The composition may further comprise one or more additives selected from the group consisting of a foaming agent and a surfactant.

The foaming agent is not particularly limited as long as it is commonly used for forming voids in a polishing pad.

For example, the foaming agent may be at least one selected from a solid phase foaming agent having a hollow structure, a liquid phase foaming agent using a volatile liquid, and an inert gas.

The solid phase foaming agent may be microcapsules (hereinafter, referred to as "thermally expanded microcapsules"), whose size has been adjusted by a thermal expansion. The thermally expanded microcapsules may be obtained by thermally expanding thermally expandable microcapsules. Since the thermally expanded microcapsules in a structure of already expanded micro-balloons have a uniform particle diameter, they have the advantage that the diameter of pores can be controlled to be uniform. Specifically, the solid phase foaming agent may be in a structure of micro-balloons having an average particle diameter of 5 μm to 200 μm.

The thermally expandable microcapsule may comprise a shell comprising a thermoplastic resin; and a foaming agent encapsulated inside the shell. The thermoplastic resin may be at least one selected from the group consisting of a vinylidene chloride-based copolymer, an acrylonitrile-based copolymer, a methacrylonitrile-based copolymer, and an acrylic-based copolymer. Furthermore, the foaming agent may be at least one selected from the group consisting of hydrocarbons having 1 to 7 carbon atoms.

The solid phase foaming agent may be employed in an amount of 0.1 part by weight to 2.0 parts by weight based on 100 parts by weight of the composition. Specifically, the solid phase foaming agent may be employed in an amount of 0.5 part by weight to 1.5 parts by weight, or 0.8 part by weight to 1.4 parts by weight, based on 100 parts by weight of the composition.

Meanwhile, the liquid phase foaming agent may be introduced during the mixing and reaction of the prepolymer and the curing agents to form pores. It does not participate in the reaction between the prepolymer and the curing agents. In addition, the liquid phase foaming agent is physically vaporized by heat generated during the mixing and reaction of the prepolymer and the curing agents to form pores.

The liquid phase foaming agent may comprise two or more volatile liquid Phase foaming agents having different boiling points. Specifically, the volatile liquid phase foaming agent may comprise one or more low-boiling point liquid phase foaming agents and one or more high-boiling point liquid phase foaming agents.

The volatile liquid phase foaming agent may be liquid at 25° C. while it does not react with an isocyanate group, an amide group, and an alcohol group. Specifically, the volatile liquid phase foaming agent may be selected from the group consisting of trichlorofluoromethane, 2,2-dichloro-1,1,1-trifluoroethane, 1,1-dichloro-1-fluoroethane, cyclopentane, n-pentane, cyclohexane, n-butyl acetate, bis(nonafluorobutyl)(trifluoromethyl)amine; and perfluoro compounds such as perfluorotributylamine, perfluoro-N-methylmorpholine, perfluorotripentylamine, and perfluorohexane.

Commercially available products of the perfluoro compound include FC-40 (3M), FC-43 (3M), FC-70 (3M), FC-72 (3M), FC-770 (3M), FC-3283 (3M), and FC-3284 (3M).

The low-boiling point liquid phase foaming agent may be vaporized at the beginning of the reaction to form mesopores having an average pore diameter of 45 to 90 μm. Specifically, the low-boiling point liquid phase foaming agent may have a boiling point of 30 to 100° C. at 1 atm. More specifically, the low-boiling point liquid phase foaming agent may have a boiling point of 40 to 70° C. at 1 atm. Even more specifically, the low-boiling point liquid phase foaming agent may be at least one selected from the group consisting of trichlorofluoromethane, 2,2-dichloro-1,1,1-trifluoroethane, 1,1-dichloro-1-fluoroethane, cyclopentane, cyclohexane, n-pentane, perfluoro-N-methylmorpholine, and perfluorohexane. Commercially available products of the low-boiling point liquid phase foaming agent include FC-72 (3M), FC-770 (3M), and FC-3284 (3M).

The high-boiling point liquid phase foaming agent may be vaporized with a delay to form micropores having an average pore diameter of 20 to 50 μm, Specifically, the high-boiling point liquid phase foaming agent may have a boiling point of 100 to 250° C. at 1 atm. More specifically, the high-boiling point liquid phase foaming agent may have a boiling point of 100 to 200° C. at 1 atm. More specifically, the high-boiling point liquid phase foaming agent may be at least one selected from the group consisting of n-butyl acetate, bis(nonafluorobutyl)(trifluoromethyl)amine, perfluorotributylamine, and perfluorotripentylamine. Commercially available products of the high-boiling point liquid phase foaming agent include FC-40 (3M), FC-43 (3M), FC-70 (3M), and FC-3283 (3M).

The low-boiling point liquid phase foaming agent and the high-boiling point liquid phase foaming agent may have a boiling point difference of 20 to 80° C., specifically 50 to 80° C. Specifically, examples of the combination of the low-boiling point liquid phase foaming agent and the high-boiling point liquid phase foaming agent include combinations of cyclopentane and n-butyl acetate, and trichlorofluoromethane and bis(nonafluorobutyl)(trifluoromethyl)amine.

The volatile liquid phase foaming agent may comprise the low-boiling point liquid phase foaming agent and the high-boiling point liquid phase foaming agent at a molar ratio of 1:0.5 to 2. Specifically, the volatile liquid phase foaming agent may comprise the low-boiling point liquid phase foaming agents and the high-boiling point liquid phase foaming agents at a molar ratio of 1:0.8 to 1.2. The liquid phase foaming agent may be employed in an amount of 1 to 10 parts by weight based on 100 parts by weight of the urethane-based prepolymer. In addition, the liquid phase foaming agent may be employed in an amount of 2 to 8 parts by weight based on 100 parts by weight of the urethane-based prepolymer.

The gas phase foaming agent may comprise an inert gas. The kind of the inert gas is not particularly limited as long as it is a gas that does not participate in the reaction between the urethane-based prepolymer and the curing agents. For example, the inert gas may be at least one selected from the group consisting of nitrogen gas ($N_2$), carbon dioxide ($CO_2$), argon gas (Ar), and helium (He). Specifically, the inert gas may be nitrogen gas ($N_2$) or carbon dioxide ($CO_2$).

The inert gas may be fed in a volume of 10% to 30% based on the total volume of the composition. Specifically, the inert gas may be fed in a volume of 15% to 30% based on the total volume of the composition.

The surfactant may act to prevent the pores to be formed from overlapping and coalescing with each other. Specifically, the surfactant is preferably a silicone-based nonionic surfactant. But other surfactants may be variously selected depending on the physical properties required for the polishing pad.

As the silicone-based nonionic surfactant, a silicone-based nonionic surfactant having a hydroxyl group may be used alone or in combination with a silicone-based nonionic surfactant having no hydroxyl group.

The silicone-based nonionic surfactant having a hydroxyl group is not particularly limited as long as it is widely used in the polyurethane technology industry since it is excellent in compatibility with an isocyanate-containing compound and an active hydrogen compound. Examples of the silicone-based nonionic surfactant having a hydroxyl group, which is commercially available, include DOW CORNING 193 (a silicone glycol copolymer in a liquid phase having a specific gravity at 25° C. of 1.07, a viscosity at 20° C. of 465 $mm^2/s$, and a flash point of 92° C.) (hereinafter referred to as DC-193) manufactured by Dow Corning.

Examples of the silicone-based nonionic surfactant having no hydroxyl group, which is commercially available, include DOW CORNING 190 (a silicone glycol copolymer having a Gardner color number of 2, a specific gravity at 25° C. of 1.037, a viscosity at 25° C. of 2,000 $mm^2/s$, a flash point of 63° C. or higher, and an inverse solubility point (1.0% water solution) of 36° C. (hereinafter referred to as DC-190) manufactured by Dow Corning.

The surfactant may be employed in an amount of 0.1 to 2 parts by weight based on 100 parts by weight of the composition. Specifically, the surfactant may be employed in an amount of 0.2 to 0.8 part by weight, 0.2 to 0.7 part by weight, 0.2 to 0.6 part by weight, or 0.2 to 1.5 parts by weight, based on 100 parts by weight of the composition. If the amount of the surfactant is within the above range, pores derived from the gas phase foaming agent can be stably formed and maintained in the mold.

Gelation Time

The composition comprising the mixture of curing agents takes a certain time to gelate by curing, which is referred to as gelation time.

According to an embodiment, when the first curing agent is employed more than the second curing agent, the gelation time of the composition may be at least 50 seconds, at least 70 seconds, at least 80 seconds, or at least 100 seconds. For example, the gelation time of the composition may be 50 seconds to 200 seconds, 50 seconds to 150 seconds, 50 seconds to 100 seconds, 100 seconds to 200 seconds, or 150 seconds to 200 seconds. As a specific example, the composition may have a gelation time of 80 seconds to 120 seconds. The gelation time may be, for example, a value measured at 70° C.

According to an embodiment, when the second curing agent is employed equal to, or more than, the first curing agent, the gelation time of the composition may be the same as described above.

Characteristics Upon Gelation

The physical properties of the composition upon curing may be adjusted to specific ranges.

According to an embodiment, when the first curing agent is employed more than the second curing agent, the mechanical properties of the composition upon curing such as tensile strength, elongation, hardness, and the like may be adjusted to specific ranges.

Specifically, the tensile strength of the composition upon curing may be 5 $N/mm^2$ to 30 $N/mm^2$, 10 $N/mm^2$ to 25 $N/mm^2$, 10 $N/mm^2$ to 20 $N/mm^2$, 15 $N/mm^2$ to 30 $N/mm^2$, or 17 $N/mm^2$ to 23 $N/mm^2$.

In addition, the elongation of the composition upon curing may be 50% to 300%, 80% to 300%, 90% to 200%, or 100% to 150%.

In addition, the hardness of the composition upon curing may be 30 Shore D to 80 Shore D, 40 Shore D to 70 Shore D, 50 Shore D to 70 Shore D, 40 Shore D to 60 Shore D, or 50 Shore D to 60 Shore D.

In addition, the modulus of the composition upon curing may be 40 MPa to 150 MPa, 50 MPa to 120 MPa, 50 MPa to 110 MPa, or 50 MPa to 100 MPa.

As a specific example, the composition upon curing may have a modulus of 50 MPa to 120 MPa and an elongation of 90% to 200%. In addition, the composition upon curing may have a tensile strength of 17 $N/mm^2$ to 23 $N/mm^2$, an elongation of 90% to 200%, a hardness of 50 Shore D to 60 Shore D, and a modulus of 50 MPa to 120 MPa.

The composition upon curing may have a plurality of micropores.

The average size of the micropores may be 10 μm to 50 μm, 20 μm to 50 μm, 20 μm to 40 μm, 20 μm to 30 μm, or 30 μm to 50 μm.

In addition, the composition upon curing may have a polishing rate (or removal rate) of 3,000 Å/minute to 5,000 Å/minute, 3,000 Å/minute to 4,000 Å/minute, 3,500 Å/minute to 4,000 Å/minute, 3,500 Å/minute to 3,800 Å/minute, 3,500 Å/minute to 3,770 Å/minute, or 3,600 Å/minute to 3,760 Å/minute, when polished at about 50 to 60° C. for 1 hour. In particular, the composition upon curing may have stable thermal characteristics even at high temperatures.

In addition, the composition upon curing may have a hardness of 50 Shore D to 60 Shore D, 50 Shore D to 58 Shore D, and 40 Shore D to 55 Shore D at 30° C., 50° C., and 70° C., respectively. Specifically, it may have a hardness of 55 Shore D to 60 Shore D, 52 Shore D to 55 Shore D, and 43 Shore D to 49 Shore D at 30° C., 50° C., and 70° C., respectively.

The composition upon curing may have a hardness difference between 30° C. and 70° C. of 5 Shore D to 15 Shore D, specifically 6 Shore D to 12 Shore D, more specifically 7 Shore D to 12 Shore D.

The number of surface defects of a semiconductor substrate of the composition upon curing may be 10 or less, 5 or less, or 4 or less at a temperature of 50 to 60° C. The number of defects may be measured for the entire surface of a semiconductor substrate, specifically a wafer to be polished. For example, the size of the wafer may be 300 mm in diameter (excluding 3 mm edge), but the size may be variously changed according to a desired purpose.

The composition according to an embodiment has excellent physical properties, particularly elongation, minimizes the occurrence of defects such as scratches on the surface of a semiconductor substrate. and provides a high polishing rate. Thus, it can be advantageously used for the preparation of a polishing pad.

According to an embodiment, when the second curing agent is employed equal to, or more than, the first curing agent, the mechanical properties of the composition upon curing such as storage modulus, tensile strength, elongation, hardness, and the like may be adjusted to specific ranges.

The composition according to an embodiment upon curing may have a storage modulus of $2.3 \times 10^8$ Pa or more, specifically $2.4 \times 10^8$ Pa to $3.25 \times 10^8$ Pa, more specifically $2.5 \times 10^8$ Pa to $3.2 \times 10^8$ Pa at a temperature of 60° C. to 80° C., specifically 70° C. A polishing pad using a composition having a storage modulus in the above range is useful for the planarization in the polishing of a semiconductor substrate. It is also useful for the uses in the polishing of glass in which a polishing pad having a high storage modulus is required. In addition, such a polishing pad is stable, and it is possible to carry out a polishing operation with high polishing efficiency.

Storage modulus refers to the energy stored without loss due to elasticity. For example, the storage modulus of a polishing pad may be measured using a dynamic mechanical analyzer DMS 6100 (Seiko). Specifically, the storage modulus of a composition is measured at 50° C. to 100° C. when a jig for tensile testing is used as a dynamic mechanical analyzer, sinusoidal vibration is applied, and the frequency is 1 Hz. As to the conditions for measuring storage modulus, for example, the polishing pad is pressed against the object to be polished during polishing, both are rotating, which is approximately at 1 Hz, and the storage modulus may be measured at a temperature of 50° C. to 100° C., specifically 60° C. to 80° C., specifically 70° C., due to the frictional heat at that time while the polishing pad is at a temperature of 40° C.

In addition, the storage modulus tends to decrease as the temperature increases. But the lower the reduction rate, the more preferable from the viewpoint of thermal resistance. For example, the thermal resistance decreases as the rate of reduction in the storage modulus with respect to a temperature change of 50° C. to 100° C. increases.

According to an embodiment, the rate of reduction in the storage modulus with respect to a temperature change of 50° C. to 100° C. may be 77% or less, specifically 75% or less, more specifically 50% to 75%. If the rate of reduction in the storage modulus exceeds 77%, it may mean that the thermal resistance decreases with respect to temperature change. Thus, the polishing pad according to an embodiment of the present invention is excellent in polishing rate at the polishing temperature, i.e., 40° C., and thermal resistance even at a high temperature of 50° C. to 100° C.

The tensile strength of the composition upon curing may be 5 N/mm² to 23 N/mm², 10 N/mm² to 23 N/mm², 15 N/mm² to 23 N/mm², 21 N/mm² to 23 N/mm², or 21.8 N/mm² to 22.5 N/mm².

In addition, the elongation of the composition upon curing may be 50% to 300%, 70% to 200%, 80% to 250%, or 80% to 150%.

In addition, the hardness of the composition upon curing may be 30 Shore D to 80 Shore D, 40 Shore D to 70 Shore D, 50 Shore D to 70 Shore D, 40 Shore D to 60 Shore D, or 50 Shore D to 60 Shore D.

In addition, the modulus of the composition upon curing may be 40 MPa to 150 MPa, 50 MPa to 120 MPa, 50 MPa to 110 MPa, or 63 MPa to 100 MPa.

As a specific example, the composition upon curing may have a modulus of 63 MPa to 100 MPa and a tensile strength of 21 N/mm² to 23 N/mm².

The composition upon curing may have a plurality of micropores.

The average size of the micropores may be 10 μm to 50 μm, 20 μm to 50 μm, 20 μm to 40 μm, 20 μm to 30 μm, or 30 μm to 50 μm.

In addition, the composition upon curing may have a polishing rate (or removal rate) of 3,000 Å/minute to 5,000 Å/minute, 3,000 Å/minute to 4,000 Å/minute, 3,500 Å/minute to 4,000 Å/minute, 3,500 Å/minute to 3,820 Å/minute, 3,620 Å/minute to 3,820 Å/minute, or 3,720 Å/minute to 3,820 Å/minute, when polished at about 50° C. to 60° C.

In particular, the difference in the polishing rate of the composition upon curing with respect to a change in temperature and time, for example, a change of about 50° C. for 1 hour to 60° C. for 8 hours may be about 1 Å/minute to 100 Å/minute, 3 Å/minute to 80 Å/minute, or 4 Å/minute to 60 Å/minute. That is, the composition according to an embodiment upon curing has little change in polishing rate with respect to a change in temperature and time and may have stable thermal characteristics even at high temperatures. According to an embodiment of the present invention, the rate of change in the polishing rate with respect to a temperature change of about 50° C. to about 60° C. may be 2% or less, specifically less than 2%, or 0.2% to 1.9%, more specifically 0.3% to 1.9%.

In addition, the composition upon curing may have a hardness of 50 Shore D to 60 Shore D, 50 Shore D to 58 Shore D, and 40 Shore D to 55 Shore D at 30° C., 50° C., and 70° C., respectively. Specifically, it may have a hardness of 55 Shore D to 60 Shore D, 52 Shore D to 55 Shore and 43 Shore D to 49 Shore D at 30° C., 50° C., and 70° C., respectively.

The composition upon curing may have a hardness difference between 30° C. and 70° C. of 5 Shore D to 15 Shore D, specifically 6 Shore D to 12 Shore D, more specifically 7 Shore D to 12 Shore D.

The composition according to an embodiment has a low reduction rate in the storage modulus at high temperatures, resulting in excellent thermal resistance, is excellent in tensile strength and modulus, as well as can enhance the polishing stability for a long period of time at high temperatures. Thus, it can be advantageously used for the preparation of a polishing pad.

Hereinafter, the specific components of the polishing layer according to the process for preparing a polishing pad according to an embodiment of the present invention will be described in detail.

[Process for Preparing A Polishing Pad]

The process for preparing a polishing pad according to an embodiment comprises preparing a first raw material composition comprising a urethane-based prepolymer; preparing a second raw material composition comprising a first curing agent containing sulfur and a second curing agent containing an ester group; preparing a third raw material composition comprising a foaming agent; sequentially or simultaneously mixing the first raw material composition with the second raw material composition and the third raw material composition to prepare a raw material mixture; and injecting the raw material mixture into a mold and curing it.

The types and contents of the urethane-based prepolymer contained in the first raw material composition, the first curing agent (or liquid curing agent) and the second curing agent (or solid curing agent) contained in the second raw material composition, and the foaming agent contained in the third raw material composition are as described above.

The step of preparing the raw material mixture may be carried out by mixing the first raw material composition with the second raw material composition, followed by further mixing thereof with the third raw material composition, or by mixing the first raw material composition with the third raw material composition, followed by further mixing thereof with the second raw material composition.

As an example, the urethane-based prepolymer, the mixture of curing agents, and the foaming agent may be put into the mixing process substantially at the same time. If the foaming agent, the surfactant, and the inert gas are further added, they may be put into the mixing process substantially at the same time.

As another example, the urethane-based prepolymer, the foaming agent, and the surfactant may be mixed in advance, and the mixture of curing agents, or the mixture of curing agents and the inert gas together, may be subsequently introduced.

The mixing initiates the reaction of the urethane-based prepolymer and the mixture of curing agents by mixing them and uniformly disperses the foaming agent and the inert gas in the raw materials. In such event, a reaction rate controlling agent may intervene in the reaction between the urethane-based prepolymer and the mixture of curing agents from the beginning of the reaction, to thereby control the reaction rate. Specifically, the mixing may be carried out at a rate of 1,000 to 10,000 rpm or 4,000 to 7,000 rpm. Within the above speed range, it may be more advantageous for the inert gas and the foaming agent to be uniformly dispersed in the raw materials.

In addition, the step of preparing the raw material mixture may be carried out under the condition of 50° C. to 150° C. If necessary, it may be carried out under vacuum defoaming conditions.

The step of injecting the raw material mixture into a mold and curing it may be carried out under the temperature condition of 60° C. to 120° C. and the pressure condition of 50 kg/m² to 200 kg/m².

In addition, the above preparation process may further comprise the steps of cutting the surface of a polishing pad thus obtained, machining grooves on the surface thereof, bonding with the lower part, inspection, packaging, and the like. These steps may be carried out in a conventional manner for preparing a polishing pad.

[Polishing Pad]

The polishing pad according to an embodiment comprises a polishing layer comprising a urethane-based prepolymer and a mixture of curing agents, wherein the mixture of curing agents comprises a first curing agent containing sulfur and a second curing agent containing an ester group, and the first curing agent is employed more than the second curing agent.

The thickness of the polishing pad may be 0.8 mm to 5.0 mm, 1.0 mm to 4.0 mm, 1.0 mm to 3.0 mm, 1.5 mm to 2.5 mm, 1.7 mm to 2.3 mm, or 2.0 mm to 2.1 mm. Within the above range, the basic physical properties as a polishing pad can be sufficiently exhibited while the particle size variation between the upper and lower portions is minimized.

The specific gravity of the polishing pad may be 0.6 g/cm³ to 0.9 g/cm³ or 0.7 g/cm³ to 0.85 g/cm³.

The polishing pad may have the same physical properties and pore characteristics as those of the composition according to the above embodiment upon curing.

In addition, the polishing rate (or removal rate) of the polishing pad may be 3,000 Å/minute to 5,000 Å/minute, 3,000 Å/minute to 4,000 Å/minute, 3,500 Å/minute to 4,000 Å/minute, 3,500 Å/minute to 3,800 Å/minute, 3,500 Å/minute to 3,770 Å/minute, or 3,600 Å/minute to 3,760 Å/minute, when polished at about 50 to 60° C. for 1 hour. In particular, the polishing pad may have stable thermal characteristics even at high temperatures.

The polishing rate may be an initial polishing rate immediately after the curing of the polishing pad (i.e., immediately after the preparation thereof). If the initial polishing rate is within the above range, it is advantageous for suppressing the pad glazing phenomenon, thereby maintaining an appropriate level of excellent polishing rate in subsequent polishing processes repeatedly carried out.

The polishing pad may have grooves on its surface for mechanical polishing. The grooves may have a depth, a width, and a spacing as desired for mechanical polishing, which are not particularly limited.

The polishing pad according to another embodiment may comprise an upper pad and a lower pad, wherein the upper pad may have the same composition and physical properties as those of the polishing pad according to the embodiment.

The lower pad serves to support the upper pad and to absorb and disperse an impact applied to the upper pad. The lower pad may comprise a nonwoven fabric or a suede.

In addition, an adhesive layer may be interposed between the upper pad and the lower pad.

The adhesive layer may comprise a hot melt adhesive. The hot melt adhesive may be at least one selected from the group consisting of a polyurethane resin, a polyester resin, an ethylene-vinyl acetate resin, a polyamide resin, and a polyolefin resin. Specifically, the hot melt adhesive may be at least one selected from the group consisting of a polyurethane resin and a polyester resin.

The polishing pad according to an embodiment comprises a urethane-based prepolymer and a mixture of curing agents, wherein the mixture of curing agents comprises a first curing agent containing sulfur and a second curing agent containing an ester group, the first curing agent is a liquid curing agent containing sulfur, the second curing agent is a solid curing agent containing an ester group and two or more benzene rings, and the content of the solid curing agent is equal to, or greater than, the content of the liquid curing agent based on the weight.

The thickness of the polishing pad may be the same as the case where the first curing agent is employed more than the second curing agent.

The polishing pad may have the same physical properties and pore characteristics as those of the composition according to the above embodiment upon curing.

In addition, the polishing rate (or removal rate) of the polishing pad may be 3,000 Å/minute to 5,000 Å/minute, 3,000 Å/minute to 4,000 Å/minute, 3,500 Å/minute to 4,000 Å/minute, 3,500 Å/minute to 3,820 Å/minute, 3,620 Å/minute to 3,820 Å/minute, or 3,720 Å/minute to 3,820 Å/minute, when polished at about 50 to 60° C.

In particular, the difference in the polishing rate of the polishing pad with respect to a change in temperature and time, for example, a change of about 50° C. for 1 hour to 60° C. for 8 hours may be about 1 Å/minute to 100 Å/minute, 3 Å/minute to 80 Å/minute, or 4 Å/minute to 60 Å/minute.

That is, the polishing pad according to an embodiment has little change in polishing rate with respect to a change in temperature and time and may have stable thermal characteristics even at high temperatures. In the polishing pad according to an embodiment, the rate of change in the polishing rate with respect to a temperature change of about 50° C. to about 60° C. may be 2% or less, specifically less than 2%, or 0.2% to 1.9%, more specifically 0.3% to 1.9%. The polishing rate may be an initial polishing rate immediately after the curing of the polishing pad (i.e., immediately after the preparation thereof). If the initial polishing rate is within the above range, it is advantageous for suppressing the pad glazing phenomenon, thereby maintaining an appropriate level of excellent polishing rate in subsequent polishing processes repeatedly carried out.

The polishing pad may have grooves on its surface for mechanical polishing. The grooves may have a depth, a width, and a spacing as desired for mechanical polishing, which are not particularly limited.

The polishing pad according to another embodiment may comprise an upper pad and a lower pad, wherein the upper pad may have the same composition and physical properties as those of the polishing pad according to the embodiment.

The lower pad serves to support the upper pad and to absorb and disperse an impact applied to the upper pad. The lower pad may comprise a nonwoven fabric or a suede.

In addition, an adhesive layer may be interposed between the upper pad and the lower pad.

The adhesive layer is the same as described above.

[Process for Preparing a Semiconductor Device]

The process for preparing a semiconductor device according to an embodiment comprises polishing the surface of a semiconductor substrate using the polishing pad according to an embodiment.

The process for preparing a semiconductor device may comprise mounting a polishing pad comprising a polishing layer on a platen; and relatively rotating the polishing surface of the polishing layer and the surface of a semiconductor substrate while they are in contact with each other to polish the surface of the semiconductor substrate.

Specifically, the process for preparing a semiconductor device according to an embodiment comprises providing a polishing pad; disposing an object to be polished on the polishing pad; and rotating the object to be polished relative to the polishing pad to polish the object to be polished.

More specifically, once the polishing pad according to an embodiment is fixed to a platen, a semiconductor substrate comprising an oxide or metal such as tungsten is disposed on the polishing pad. In such event, the surface of the semiconductor substrate is in direct contact with the polishing surface of the polishing pad. A polishing slurry may be sprayed on the polishing pad for polishing. Thereafter, the semiconductor substrate and the polishing pad rotate relatively to each other, so that the surface of the semiconductor substrate is polished.

In this regard, FIG. 8 schematically illustrates the process for preparing a semiconductor device according to an embodiment.

Referring to FIG. 8, once the polishing pad (110) according to an embodiment is fixed to a platen (120), a semiconductor substrate (130) is disposed on the polishing pad (110). In such event, the surface of the semiconductor substrate (130) is in direct contact with the polishing surface of the polishing pad (110). A polishing slurry (150) may be sprayed through a nozzle (140) on the polishing pad for polishing. The flow rate of the polishing slurry (150) supplied through the nozzle (140) may be selected according to the purpose within a range of about 10 $cm^3$/min to about 1,000 $cm^3$/min. For example, it may be about 50 $cm^3$/min to about 500 $cm^3$/min, but it is not limited thereto.

Thereafter, the semiconductor substrate (130) and the polishing pad (110) rotate relatively to each other, so that the surface of the semiconductor substrate (130) is polished. In such event, the rotation direction of the semiconductor substrate (130) and the rotation direction of the polishing pad (110) may be the same direction or opposite directions. The rotation speeds of the semiconductor substrate (130) and the polishing pad (110) may be selected according to the purpose within a range of about 10 rpm to about 500 rpm. For example, it may be about 30 rpm to about 200 rpm, but it is not limited thereto.

The semiconductor substrate (130) mounted on the polishing head (60) is pressed against the polishing surface of the polishing pad (110) at a predetermined load to be in contact therewith, the surface thereof may then be polished. The load applied to the polishing surface of the polishing pad (110) through the surface of the semiconductor substrate (130) by the polishing head (160) may be selected according to the purpose within a range of about 1 $gf/cm^2$ to about 1,000 $gf/cm^2$. For example, it may be about 10 $gf/cm^2$ to about 800 $gf/cm^2$, but it is not limited thereto.

In an embodiment, in order to maintain the polishing surface of the polishing pad (110) in a state suitable for polishing, the process for preparing a semiconductor device may further comprise processing the polishing surface of the polishing pad (110) with a conditioner (170) simultaneously with polishing the semiconductor substrate (130).

In the polishing pad according to an embodiment, a mixture of curing agents, which comprises a first curing agent containing sulfur and a second curing agent containing an ester group, is used, whereby it is possible to enhance the polishing characteristics.

In the polishing pad according to an embodiment, as the first curing agent containing sulfur is employed more than the second curing agent containing an ester group, it is possible to secure excellent hardness at high temperatures, to improve the scratches and surface defects occurring on the surface of a semiconductor substrate, and to further enhance the polishing rate. Thus, it can be advantageously used for the preparation of a semiconductor device.

In addition, in the polishing pad according to an embodiment, the content of the second curing agent containing an ester group and two or more benzene rings is equal to, or greater than, the content of the first curing agent containing sulfur, whereby it is possible to secure an appropriate level of physical properties such as tensile strength and modulus, as well as to minimize the rate of reduction in the storage modulus with respect to a temperature change at high temperatures, resulting in excellent thermal stability and further enhancements in the polishing stability.

Embodiments for Carrying Out the Invention

EXAMPLE

Hereinafter, the present invention is explained in detail by the following Examples. However, these examples are set forth to illustrate the present invention, and the scope of the present invention is not limited thereto.

Example 1

1-1: Preparation of a Urethane-Based Prepolymer

A four-necked flask was charged with toluene diisocyanate (TDI) and dicyclohexylmethane diisocyanate (H12MDI) as an isocyanate compound and polytetramethylene ether glycol (PTMEG) and diethylene glycol (DEG) as a polyol, followed by reaction thereof at 80° C. for 3 hours, thereby preparing a urethane-based prepolymer having a content of the NCO group of 9% by weight.

1-2: Preparation of a Polishing Pad

A casting machine equipped with tanks and feeding lines for a urethane-based prepolymer, a curing agent, an inert gas, and a foaming agent was charged with the urethane-based prepolymer prepared above. In addition, it was charged with 3,5-dimethylthio-2,6-diaminotoluene (DMTDA) as a first curing agent and 1,3-propanediol bis(l-aminobenzoate) as a second curing agent at a weight ratio of 80:20, and nitrogen gas ($N_2$) was prepared as an inert gas. In addition, 1.18 parts by weight of a solid phase foaming agent (Akzonobel), and 0.39 parts by weight of a silicone-based surfactant (Evonik) were charged to each tank based on 100 parts by weight of the composition for preparing polishing pad. The raw materials were stirred while they were fed to the mixing head at constant rates through the respective feeding lines. In such event, the molar equivalent ratio of the NCO group in the urethane-based prepolymer to the $NH_2$ group in the mixture of the first and second curing agents was adjusted to 1:1, and the total feed rate was maintained at a rate of 10 kg/minute. In addition, the inert gas was fed at a constant rate of 20% by volume based on the total volume of the composition for preparing a polishing pad. The raw materials were mixed at a high speed of 5,000 rpm, injected into a mold (having a width of 1,000 mm, a length of 1,000 mm, and a height of 3 mm), and solidified to obtain a porous polyurethane polishing layer in the form of a sheet. In such event, the fed rate of nitrogen gas as an inert gas was adjusted such that the density of the porous polyurethane was 0.8 $g/cm^3$.

The mixed raw materials were injected into a mold (1,000 mm×1,000 mm×3 min) and reacted to obtain a molded article in the form of a solid cake. Thereafter, the top and bottom of the molded body were each ground by a thickness of 0.5 mm to obtain an upper pad having a thickness of 2 mm.

Thereafter, the upper pad was subjected to surface milling and groove forming steps and laminated with a lower pad by a hot melt adhesive, thereby preparing a polishing pad.

Example 2

A polishing pad was prepared in the same manner as in Example 1, except that DMTDA as the first curing agent and PDPAB as the second curing agent were adjusted at a weight ratio of 60:40.

Example 3

A polishing pad was prepared in the same manner as in Example 1, except that DMTDA as the first curing agent and PDPAB as the second curing agent were adjusted at a weight ratio of 50:50.

Example 4

A polishing pad was prepared in the same manner as in Example 1, except that DMTDA as the first curing agent and PDPAB as the second curing agent were adjusted at a weight ratio of 40:60.

Example 5

A polishing pad was prepared in the same manner as in Example 1, except that DMTDA as the first curing agent and PDPAB as the second curing agent were adjusted at a weight ratio of 20:80.

Comparative Example 1

A polishing pad was prepared in the same manner as in Example 1, except that DMTDA as the first curing agent and PDPAB as the second curing agent were adjusted at a weight ratio of 100:0.

Comparative Example 2

A polishing pad was prepared in the same manner as in Example 1, except that DMTDA as the first curing agent and PDPAB as the second curing agent were adjusted at a weight ratio of 0:100.

Comparative Example 3

A polishing pad was prepared in the same manner as in Example 1, except that DMTDA as the first curing agent and MOCA as the second curing agent were adjusted at a weight ratio of 60:40.

Comparative Example 4

A polishing pad was prepared in the same manner as in Example 1, except that DMTDA as the first curing agent and MOCA as the second curing agent were adjusted at a weight ratio of 50:50.

Comparative Example 5

A polishing pad was prepared in the same manner as in Example 1, except that DMTDA as the first curing agent and MOCA as the second curing agent were adjusted at a weight ratio of 40:60.

Comparative Example 6

A polishing pad was prepared in the same manner as in Example 1, except that DMTDA as the first curing agent and MOCA as the second curing agent were adjusted at a weight ratio of 0:100.

Specific process conditions for preparing the upper pad of the polishing pad are summarized in Tables 1 and 2 below.

TABLE 1

|  |  | Example | | | | |
|---|---|---|---|---|---|---|
|  |  | 1 | 2 | 3 | 4 | 5 |
| Upper pad | Content of NCO gourp in the prepolymer | 9% by weight | | | | |
|  | First curing agent (DMTDA): second curing agent (PDPAB) (weight ratio) | 80:20 | 60:40 | 50:50 | 40:60 | 20:80 |
|  | Casting mold | Single layer | Single layer | Single layer | Single layer | Single layer |
|  | Sheet machining (casting, cutting, and grooving) | Sequential | Sequential | Sequential | Sequential | Sequential |
|  | Prepolymer (part by weight) | 78.48 | 77.35 | 76.73 | 76.08 | 74.66 |
|  | DMTDA | 15.96 | 12.66 | 10.87 | 8.96 | 4.77 |
|  | PDPAB | 3.99 | 8.44 | 10.87 | 13.44 | 19.08 |
|  | Surfactant | 0.39 | 0.39 | 0.38 | 0.38 | 0.37 |
|  | Solid phase foaming agent | 1.18 | 1.16 | 1.15 | 1.14 | 1.12 |
|  | Total weight of the composition (part by weight) | 100 | 100 | 100 | 100 | 100 |

DMTDA: 3,5-dimethylthio-2,6-diaminotoluene
PDPAB: 1,3-propanediol bis(4-aminobenzoate)

TABLE 2

|  |  | Comparative Example | | | | | |
|---|---|---|---|---|---|---|---|
|  |  | 1 | 2 | 3 | 4 | 5 | 6 |
| Upper pad | Content of NCO gourp in the prepolymer | 9% by weight | | | | | |
|  | First curing agent (DMTDA): second curing agent (PDPAB or MOCA) (weight ratio) | 100:0 | 0:100 | 60:40 | 50:50 | 40:60 | 0:100 |
|  | Casting mold | Single layer | Single layer | Single layer | Single layer | Single layer | Single layer |
|  | Sheet machining (casting, cutting, and grooving) | Sequential | Sequential | Sequential | Sequential | Sequential | Sequential |
|  | Prepolymer (pail by weight) | 79.48 | 73.02 | 74.87 | 74.58 | 74.28 | 76.92 |
|  | DMTDA | 18.93 | 0.00 | 14.18 | 11.96 | 9.69 | 0.00 |
|  | PDPAB | 0.00 | 25.51 | 0.00 | 0.00 | 0.00 | 0.00 |
|  | MOCA | 0.00 | 0.00 | 9.46 | 11.96 | 14.54 | 21.54 |
|  | Solid phase foaming agent | 1.19 | 1.10 | 0.37 | 0.37 | 0.37 | 0.38 |
|  | Surfactant | 0.4 | 0.37 | 1.12 | 1.12 | 1.11 | 1.15 |
|  | Total weight of the composition (part by weight) | 100 | 100 | 100 | 100 | 100 | 100 |

DMTDA: 3,5-dimethylthio-2,6-diaminotoluene
PDPAB: 1,3-propanediol bis(4-aminobenzoate)
MOCA: 4,4'-methylenebis(2-chloroaniline)

Test Example

The polishing pads obtained in the Examples and the Comparative Example were tested for the following items. The results are shown in Tables 3 and 4 and FIGS. 1 to 7.

(1) Hardness

The Shore D hardness of the polishing pads prepared in the Examples and the Comparative Examples was measured. The polishing pads prepared in the Examples and the Comparative Examples were each cut into a size of 2 cm×2 cm (thickness: 2 mm) and then allowed to stand for 16 hours in an environment of a temperature of 25° C., 30° C., 50° C., and 70° C. and a humidity of 50±5%. Thereafter, the hardness of the multilayer polishing pad was measured using a hardness meter (D-type hardness meter).

(2) Specific Gravity

The polishing pads prepared in the Examples and the Comparative Examples were each cut into a rectangle of 4 cm×8.5 cm (thickness: 2 mm) and then allowed to stand for 16 hours in an environment of a temperature of 23±2° C. and a humidity of 50±5%. The specific gravity of the polishing pad was measured using a gravimeter.

(3) Tensile Strength

The polishing pads prepared in the Examples and the Comparative Examples were each cut to 4 cm×1 cm (thickness: 2 mm). The ultimate strength immediately before the fracture was measured while the polishing pad was tested at a rate of 50 mm/min using a universal testing machine (UTM).

(4) Elongation

The polishing pads prepared in the Examples and the Comparative Examples were each cut to 4 cm×1 cm (thickness: 2 mm). The maximum deformation immediately before the fracture was measured while the polishing pad was tested at a rate of 50 mm/min using a universal testing machine (UTM). The ratio of the maximum deformation to the initial length was expressed in percent (%).

(5) Modulus

The polishing pads prepared in the Examples and the Comparative Examples were each subjected to the same measuring method as that for tensile strength below. The slope of the strain-stress curve in the initial elastic region was calculated.

The results are shown in Tables 3 and 4 below.

In addition, in Examples 3 to 5, in which the content of the second curing agent was equal to, or greater than, the content of the first curing agent, the polishing pads were remarkably excellent in tensile strength, modulus, and hardness by temperature (30° C./50° C./70° C.).

Meanwhile, in Comparative Example 2, in which PDPAB as the second curing agent alone was used, the tensile strength and modulus were too high. In particular, the modulus in Comparative Example 2 was increased to about 2 times the modulus of the polishing pads of Examples 3 to 5.

TABLE 3

| | | Evaluation item | Ex. 1 | Ex. 2 | Ex. 3 | Ex. 4 | Ex. 5 |
|---|---|---|---|---|---|---|---|
| Physical properties | Upper pad | Thickness (mm) | 2 | 2 | 2 | 2 | 2 |
| | | Hardness at 25° C. (Shore D) | 58 | 58.1 | 58.2 | 58.4 | 58.7 |
| | | Avg. pore size (μm) | 23.1 | 22.9 | 23.6 | 23.4 | 23.2 |
| | | Specific gravity (g/cc) | 0.81 | 0.80 | 0.82 | 0.81 | 0.80 |
| | | Tensile strength (N/mm$^2$) | 21.2 | 21.7 | 21.8 | 22.3 | 22.5 |
| | | Elongation (%) | 103.7 | 100.3 | 98.2 | 88.5 | 83.2 |
| | | Modulus (MPa) | 58.2 | 62.1 | 66.3 | 70.2 | 72.4 |
| | | Hardness by temperature (Shore D) (30° C./50° C./70° .C) | 57.6/ 53.5/ 46.6 | 58.1/ 53.8/ 46.9 | 58.2/ 54.1/ 47.2 | 58.3/ 54.3/ 47.4 | 58.7/ 54.5/ 47.7 |
| | Lower pad | Type | Non-woven fabric | Non-woven fabric | Non-woven fabric | Non-woven fabric | Non-woven fabric |
| | | Thickness (mm) | 1.1 | 1.1 | 1.1 | 1.1 | 1.1 |
| | | Hardness (Asker C) | 70 | 70 | 70 | 70 | 70 |
| | Laminated pad | Thickness (mm) | 3.32 | 3.32 | 3.32 | 3.32 | 3.32 |
| | | Compression rate (%) | 1.05 | 1.05 | 1.05 | 1.05 | 1.05 |

TABLE 4

| | | Evaluation Item | C. Ex. 1 | C. Ex. 2 | C. Ex. 3 | C. Ex. 4 | C. Ex. 5 | C. Ex. 6 |
|---|---|---|---|---|---|---|---|---|
| Physical properties | Upper pad | Thickness (mm) | 2 | 2 | 2 | 2 | 2 | 2 |
| | | Hardness at 25° C. (Shore D) | 57.5 | 59.2 | 58.3 | 58.5 | 58.7 | 58.9 |
| | | Avg. pore size (μm) | 23 | 23.7 | 23 | 23 | 23 | 23 |
| | | Specific gravity (g/cc) | 0.81 | 0.82 | 0.82 | 0.81 | 0.80 | 0.80 |
| | | Tensile strength (N/mm$^2$) | 20.8 | 23.2 | 21.7 | 21.8 | 22.3 | 22.5 |
| | | Elongation (%) | 107.5 | 75 | 110 | 99.7 | 89.2 | 80.3 |
| | | Modulus (MPa) | 43.1 | 130 | 60.3 | 63.2 | 67.8 | 71.2 |
| | | Hardness by temperature (Shore D) (30° C./50° C./70° C.) | 56.8/ 52.8/ 45.6 | 59.1/ 55.0/ 48.2 | 58.0/ 53.7/ 46.7 | 58.2/ 54.0/ 47.1 | 58.4/ 54.2/ 47.3 | 58.8/ 54.4/ 47.6 |
| | Lower pad | Type | Non-woven fabric | Non-woven fabric | Non-woven fabric | Non-woven fabric | Non-woven fabric | Non-woven fabric |
| | | Thickness (mm) | 1.1 | 1.1 | 1.1 | 1.1 | 1.1 | 1.1 |
| | | Hardness (Asker C) | 70 | 70 | 70 | 70 | 70 | 70 |
| | Laminated pad | Thickness (mm) | 3.32 | 3.32 | 3.32 | 3.32 | 3.32 | 3.32 |
| | | Compression rate (%) | 1.05 | 1.05 | 1.05 | 1.05 | 1.05 | 1.05 |

As shown in Tables 3 and 4 above, the physical properties of the polishing pad vary with the contents of the first and second curing agents.

Specifically, in Examples 1 and 2, in which the content of the first curing agent was greater than the content of the second curing agent, the polishing pads had remarkably excellent elongation while maintaining appropriate levels of hardness, modulus, and tensile strength.

Further, it was possible in the Examples, without the use of MOCA containing harmful substances, to achieve physical properties at least equal to those of the polishing pads that used MOCA.

(6) Pore Characteristics

The cross-section of the polishing pads was observed by scanning electron microscopy (SEM), which are shown in FIGS. 1 to 4. FIGS. 1 to 4 are SEM images of a cross-section of the polishing pads prepared in Examples 1, 3, and 5 and Comparative Example 2. As shown in FIGS. 1 to 4, the pores of the polishing pads of the Examples are finely and uniformly distributed over a large area.

In addition, the pore characteristics of Examples 3 and 5 and Comparative Example 2 were calculated based on the SEM images and summarized in Table 5 below.

Number average diameter: average of the sum of the pore diameters divided by the number of pores on the SEM image Number of pores: Number of pores per 0.3 cm$^3$ on the SEM image Pore area ratio: percentage of the area of the pores relative to the total area of the SEM image

TABLE 5

|  | Ex. 3 | Ex. 5 | C. Ex. 2 |
| --- | --- | --- | --- |
| Number average diameter (μm) | 23.6 | 23.2 | 23.7 |
| Number of pores (per 0.3 cm$^3$) | 178 | 184 | 188 |
| Pore area ratio (%) | 44 | 43.2 | 42.5 |

As can be seen from Table 5 above, the polishing pads of Examples 3 and 5 had a number average diameter of pores of about 20 to 26 atm and a pore area ratio of about 41% to 45%.

(7) Polishing Rate (Removal Rate)

The initial polishing rate immediately after the polishing pad had been prepared was measured as follows.

A silicon wafer having a diameter of 300 mm was deposited with silicon oxide by a CVD process. The polishing pad was mounted on a CMP machine, and the silicon wafer was set with the silicon oxide layer thereof facing the polishing surface of the polishing pad. The silicon oxide layer was polished under a polishing load of 4.0 psi while it was rotated at a speed of 150 rpm for 60 seconds and a calcined silica slurry was supplied onto the polishing pad at a rate of 250 ml/min.

Polishing was carried out at 50 to 60° C. for 1 hour. Upon completion of the polishing, the silicon wafer was detached from the carrier, mounted in a spin dryer, washed with distilled water, and then dried with nitrogen for 15 seconds. The changes in the film thickness of the dried silicon wafer before and after the polishing were measured using a spectral reflectometer type thickness measuring instrument (SI-F80R, Kyence). The polishing rate was calculated using the following Equation 1. The results are shown in Table 6 below.

Polishing rate (Å/min)=polished thickness of a silicon wafer (Å)/polishing time (minute)　　[Equation f]

TABLE 6

| 1 hr/pad surface temperature of 50 to 60° C. | | | | | | | |
| --- | --- | --- | --- | --- | --- | --- | --- |
|  | Ex. 1 | Ex. 2 | Ex. 3 | Ex. 4 | Ex. 5 | C. Ex. 1 | C. Ex. 2 |
| Polishing rate (Å/min) | 3,733 | 3,740 | 3,751 | 3,755 | 3,760 | 3,715 | 3,763 |

In addition, after the silicon oxide film was polished, polishing was carried out by further segmenting the polishing temperature and time, and the polishing rate was calculated in the same manner as described above. Specifically, polishing was carried out at 51.3° C. for 1 hour, at 56.2° C. for 4 hours, and at 60.3° C. for 8 hours, respectively. The results are shown in Tables 7 to 9 below.

TABLE 7

| 1 hr/pad surface temperature of 51.3° C. | | | | | | | |
| --- | --- | --- | --- | --- | --- | --- | --- |
|  | Ex. 1 | Ex. 2 | Ex. 3 | Ex. 4 | Ex.5 | C. Ex. 1 | C. Ex. 2 |
| Polishing rate (Å/min) | 3,718 | 3,733 | 3,740 | 3,728 | 3,736 | 3,730 | 3,720 |

TABLE 8

| 4 hrs/pad surface temperature of 56.2° C. | | | | | | | |
| --- | --- | --- | --- | --- | --- | --- | --- |
|  | Ex. 1 | Ex. 2 | Ex. 3 | Ex. 4 | Ex. 5 | C. Ex. 1 | C. Ex. 2 |
| Polishing rate (Å/min) | 3,829 | 3,793 | 3,770 | 3,753 | 3,744 | 3,942 | 3,718 |

FIG. 9

| 8 hrs/pad surface temperature of 60.3° C. | | | | | | | |
| --- | --- | --- | --- | --- | --- | --- | --- |
|  | Ex. 1 | Ex. 2 | Ex. 3 | Ex. 4 | Ex. 5 | C. Ex. 1 | C. Ex. 2 |
| Polishing rate (Å/min) | 3,912 | 3,852 | 3,810 | 3,780 | 3,752 | 4,213 | 3,722 |

Referring to the above results, the polishing pads of the Examples maintained a constant polishing rate within an appropriate range. In addition, the rate of change in the polishing rate remained constant with respect to changes in temperature and time, whereas it was significantly changed with an increase of about 13% in the polishing pad of Comparative Example 1.

(8) Number of Defects

After the same CMP process as in the above Test Example (7) was carried out using the polishing pad, the surface of the wafer was observed using a water inspection equipment (AIT XP±, KLA Tencor) to measure the number of defects appearing on the wafer surface upon the polishing (threshold: 150, die filter threshold: 280). The results are shown in Table 10 and FIG. 6.

TABLE 10

| 1 hr/pad surface temperature of 50 to 60° C. | | | | | | | |
| --- | --- | --- | --- | --- | --- | --- | --- |
|  | Ex. 1 | Ex. 2 | Ex. 3 | Ex. 4 | Ex. 5 | C. Ex. 1 | C. Ex. 2 |
| Defects (counts) | 4 | 10 | 22 | 36 | 62 | 2 | 104 |

Referring to the above results, in the case where a mixture of curing agents in which the first curing agent was more employed (Examples 1 and 2), the polishing rate of the polishing pad was excellent, and the number of defects was significantly lower than that of the Comparative Examples.

Specifically, from the results in Table 4 and 10, the polishing rates of 3,733 Å/minutes and 3,740 Å/minutes in Examples 1 and 2 were overall excellent. In contrast, the polishing rate of the polishing pad of Comparative Example 1 without PDPAB was 3,715 Å/min, which was significantly low, and the polishing rate of the polishing pad of Comparative Example 2 using PDPAB alone was 3,763 Å/min, in which the initial polishing rate was excessively high as the agglomeration of the hard segments was increased. Thus, the polishing pad of Comparative Example 2 is expected to sharply decrease in the polishing rate due to the pad glazing phenomenon.

Therefore, in the case of the polishing pads of Examples 1 and 2, the polishing rate can be enhanced while the number of defects can be significantly reduced.

(9) Storage Modulus

The storage modulus of the polishing pads of the Examples and the Comparative Examples was measured using a dynamic mechanical analyzer DMS 6100 (Seiko) in a tension mode under the conditions of a frequency of 1 Hz and a temperature elevation rate of 10° C./minute.

Here, the storage modulus (E') was measured in the temperature range of 60° C. to 140° C., and the reduction rate in the storage modulus (ΔE') in the temperature range of 50° C. to 100° C. was calculated. The reduction rate in storage modulus (ΔE') was calculated according to the following Equation 2.

Rduction rate in storage modulus $(\Delta E')=(E'_{50}-E'_{100})/E'_{50}\times 100$     [Equation 2]

In Equation 2, $E'_{50}$ is the storage modulus at 50° C., and $E'_{100}$ is the storage modulus at 100° C.

The results are shown in FIG. 7.

As can be seen from FIG. 7, when a mixture of curing agents, in which the second curing agent was employed equal to, or more than, the first curing agent, was used (Examples 3 to 5), the reduction rate in the storage modulus of the polishing pads was significantly low as compared with Comparative Examples 1 and 2.

Specifically, the rates of reduction in the storage modulus of the polishing pads of Examples 3 to 5 were 75% or less, specifically the rates of reduction in the storage modulus of the polishing pads of Examples 1, 2, and 3 were about 75%, 71%, and 70%, respectively. In contrast, the rate of reduction in the storage modulus of the polishing pad of Comparative Example was 84% or more.

Thus, in the polishing pads of Examples 3 to 5, the reduction rate in the storage modulus was low, resulting in a remarkably improved thermal resistance.

REFERENCE NUMERAL OF THE DRAWINGS

| | |
|---|---|
| 110: polishing pad | 120: platen |
| 130: semiconductor substrate | 140: nozzle |
| 150: polishing slurry | 160: polishing head |
| 170: conditioner | |

The invention claimed is:

1. A composition for a polishing pad, which comprises a urethane-based prepolymer and a mixture of curing agents, wherein the mixture of curing agents comprises a first curing agent containing sulfur and a second curing agent containing an ester group,
   wherein a weight ratio of the first curing to the second curing agent is 1:0.1 to 0.9, and
   wherein the content of the first curing agent is 11 parts by weight to 18 parts by weight based on 100 parts by weight of the composition, and the content of the second curing agent is 1 part by weight to 10 parts by weight based on 100 parts by weight of the composition.

2. The composition for a polishing pad of claim 1, wherein the first curing agent comprises at least one selected from the group consisting of 3,5-dimethylthio-2,6-diaminotoluene, 2,6-bis(methylthio)-4-methyl-1,3-benzenediamine, molybdenum sulfide, niobium sulfide, talc, tantalum sulfide, and tungsten disulfide.

3. The composition for a polishing pad of claim 1, wherein the second curing agent comprises at least one selected from the group consisting of compounds represented by the following Formulae 1 to 3:

[Formula 1]
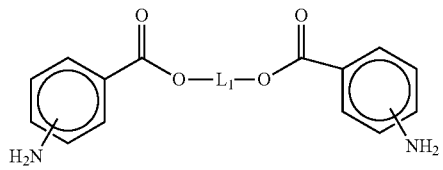

[Formula 2]
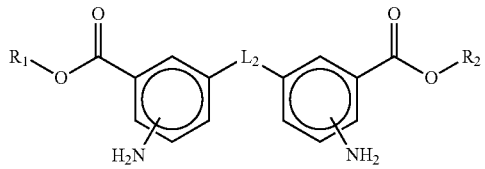

[Formula 3]
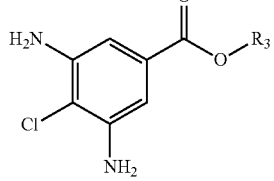

in Formula 1, $L_1$ is at least one selected from a linear or branched alkylene group having 1 to 20 carbon atoms, a linear or branched heteroalkylene group having 1 to 20 carbon atoms, a substituted or unsubstituted cycloalkylene group having 5 to 30 carbon atoms, a substituted or unsubstituted heterocycloalkylene group having 5 to 30 carbon atoms, a substituted or unsubstituted arylene group having 5 to 30 carbon atoms, and a substituted or unsubstituted heteroarylene group having 5 to 30 carbon atoms, in Formula 2, $L_2$ is at least one selected from a linear or branched alkylene group having 1 to 20 carbon atoms, a linear or branched heteroalkylene group having 1 to 20 carbon atoms, a substituted or unsubstituted cycloalkylene group having 5 to 30 carbon atoms, a substituted or unsubstituted heterocycloalkylene group having 5 to 30 carbon atoms, a substituted or unsubstituted arylene group having 5 to 30 carbon atoms, and a substituted or unsubstituted heteroarylene group having 5 to 30 carbon atoms, $R_1$ and $R_2$ are each independently at least one selected from a linear or branched alkyl group having 1 to 20 carbon atoms, a linear or branched heteroalkyl group having 1 to 20 carbon atoms, a substituted or unsubstituted cycloalkyl group having 5 to 30 carbon atoms, a substituted or unsubstituted heterocycloalkyl group having 5 to 30 carbon atoms, a substituted or unsubstituted aryl group having 5 to 30 carbon atoms, and a substituted or unsubstituted heteroaryl group having 5 to 30 carbon atoms, and in Formula 3, $R_3$ is at least one selected from a linear or branched alkyl group having 1 to 20 carbon atoms, a linear or branched heteroalkyl group having 1 to 20 carbon atoms, a substituted or unsubstituted cycloalkyl group having 5 to 30 carbon atoms, a substituted or unsubstituted heterocycloalkyl group having 5 to 30 carbon atoms, a substituted or unsubstituted aryl group having 5 to 30 carbon atoms, and a substituted or unsubstituted heteroaryl group having 5 to 30 carbon atoms.

4. The composition for a polishing pad of claim 3, wherein the second curing agent comprises at least one selected from the group consisting of 1,3-propanediol bis (4-aminobenzoate) (PDPAB), 4-(4-aminobenzoyl)oxyphenyl 4-aminobenzoate, 4-(4-aminobenzoyl)oxybutyl 4-aminobenzoate, 4-[4-(4-aminobenzoyl)oxy-3-methylbutoxy] butyl 4-aminobenzoate, methylene bis-methylanthranilate (MBNA), and isobutyl 3,5-diamino-4-chlorobenzoate (BDACB).

5. The composition for a polishing pad of claim 1, which, upon curing, has a modulus of 50 MPa to 120 MPa and an elongation of 90% to 200%,
a hardness of 50 Shore D to 60 Shore D at 30° C.,
a hardness of 50 Shore D to 58 Shore D at 50° C.,
a hardness of 40 Shore D to 55 Shore D at 70° C., and
the number of surface defects of a semiconductor substrate of 10 or less at a temperature of 50 to 60° C.

6. A composition for a polishing pad, which comprises a urethane-based prepolymer and a mixture of curing agents, wherein the mixture of curing agents comprises a first curing agent containing sulfur and a second curing agent containing an ester group,
wherein the first curing agent is a liquid curing agent containing sulfur, the second curing agent is a solid curing agent containing an ester group and two or more benzene rings, and the content of the solid curing agent is equal to, or greater than, the content of the liquid curing agent based on the weight,
wherein, upon curing, the composition has a storage modulus of $2.3 \times 10^8$ Pa or more at a temperature of 60 to 80° C., and a rate of reduction in the storage modulus with respect to a temperature change of 50° C. to 100° C. of 77% or less,
wherein the content of the liquid curing agent is 5 parts by weight to 30 parts by weight based on 100 parts by weight of the composition, and the content of the solid curing agent is 8.5 parts by weight to 35 parts by weight based on 100 parts by weight of the composition.

7. The composition for a polishing pad of claim 6, wherein the content ratio of the solid curing agent and the liquid curing agent is 1:0.1 to 1 as a weight ratio.

8. The composition for a polishing pad of claim 6, wherein the solid curing agent has a melting point (m.p.) of 100° C. to 150° C.

9. The composition of for a polishing pad claim 8, wherein the solid curing agent comprises at least one selected from the group consisting of compounds represented by the following Formulae 1 and 2:

[Formula 1]
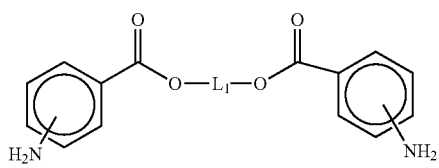

[Formula 2]
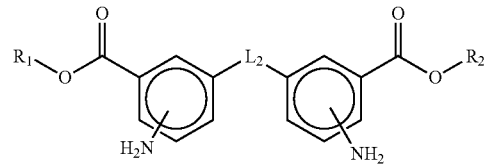

in Formula 1, $L_1$ is at least one selected from a linear or branched alkylene group having 1 to 20 carbon atoms, a linear or branched heteroalkylene group having 1 to 20 carbon atoms, a substituted or unsubstituted cycloalkylene group having 5 to 30 carbon atoms, a substituted or unsubstituted heterocycloalkylene group having 5 to 30 carbon atoms, a substituted or unsubstituted arylene group having 5 to 30 carbon atoms, and a substituted or unsubstituted heteroarylene group having 5 to 30 carbon atoms, in Formula 2, $L_2$ is at least one selected from a linear or branched alkylene group having 1 to 20 carbon atoms, a linear or branched heteroalkylene group having 1 to 20 carbon atoms, a substituted or unsubstituted cycloalkylene group having 5 to 30 carbon atoms, a substituted or unsubstituted heterocycloalkylene group having 5 to 30 carbon atoms, a substituted or unsubstituted arylene group having 5 to 30 carbon atoms, and a substituted or unsubstituted heteroarylene group having 5 to 30 carbon atoms, and $R_1$ and $R_2$ are each independently at least one selected from a linear or branched alkyl group having 1 to 20 carbon atoms, a linear or branched heteroalkyl group having 1 to 20 carbon atoms, a substituted or unsubstituted cycloalkyl group having 5 to 30 carbon atoms, a substituted or unsubstituted heterocycloalkyl group having 5 to 30 carbon atoms, a substituted or unsubstituted aryl group having 5 to 30 carbon atoms, and a substituted or unsubstituted heteroaryl group having 5 to 30 carbon atoms.

10. The composition for a polishing pad of claim 9, wherein the solid curing agent comprises at least one selected from the group consisting of 1,3-propanediol bis (4-aminobenzoate) (PDPAB), 4-(4-aminobenzoyl)oxyphenyl 4-aminobenzoate, 4-(4-aminobenzoyl)oxybutyl 4-aminobenzoate, 4-[4-(4-aminobenzoyl)oxy-3-methylbutoxy] butyl 4-aminobenzoate, and methylene bis-methylanthranilate (MBNA).

11. The composition for a polishing pad of claim 6, which, upon curing, has a rate of change in a polishing rate with respect to a temperature change of 50° C. to 60° C. of 2% or less.

12. The composition for a polishing pad of claim 6, wherein the liquid curing agent has a boiling point (b.p.) of 160° C. to 240° C., and the liquid curing agent comprises at least one selected from the group consisting of 3,5-dimethylthio-2,6-diaminotoluene and 2,6-bis(methylthio)-4-methyl-1,3-benzenediamine.

13. The composition for a polishing pad of claim 6, which, upon curing, has a modulus of 63 MPa to 100 MPa and a tensile strength of 21 N/mm$^2$ to 23 N/mm$^2$,
a hardness of 50 Shore D to 60 Shore D at 30° C.,
a hardness of 50 Shore D to 58 Shore D at 50° C.,
a hardness of 40 Shore D to 55 Shore D at 70° C., and a hardness difference between 30° C. and 70° C. of 5 Shore D to 15 Shore D.

* * * * *